US006700479B2

(12) United States Patent
Birchfield

(10) Patent No.: US 6,700,479 B2
(45) Date of Patent: Mar. 2, 2004

(54) VEHICLE SECURITY SYSTEM HAVING ADVANCED WIRELESS FUNCTION-PROGRAMMING CAPABILITY

(75) Inventor: Jerry Wayne Birchfield, Vista, CA (US)

(73) Assignee: Directed Electronics, Inc., Vista, CA (US)

( * ) Notice: Subject to any disclaimer, the term of this patent is extended or adjusted under 35 U.S.C. 154(b) by 0 days.

(21) Appl. No.: 10/236,716

(22) Filed: Sep. 6, 2002

(65) Prior Publication Data

US 2003/0058083 A1 Mar. 27, 2003

Related U.S. Application Data

(63) Continuation-in-part of application No. 09/732,525, filed on Dec. 6, 2000, now Pat. No. 6,452,483, which is a continuation-in-part of application No. 08/790,954, filed on Jan. 29, 1997, now Pat. No. 6,184,779.

(51) Int. Cl.$^7$ .............................................. B60Q 25/10
(52) U.S. Cl. .............................. 340/426.14; 340/425.5; 340/539.19
(58) Field of Search .................. 340/425.5, 426.13, 340/428, 429, 430, 539.11, 539.17, 539.19, 5.22, 5.3, 426.14, 426.35; 307/10.2, 10.4, 10.5; 180/167, 287, 173; 711/103, 164, 165

(56) References Cited

U.S. PATENT DOCUMENTS

| 5,917,405 | A | * | 6/1999 | Doao | 340/426 |
| 6,028,505 | A | * | 2/2000 | Drori | 340/426 |
| 6,028,537 | A | * | 2/2000 | Suman et al. | 340/426 |
| 6,104,783 | A | * | 8/2000 | DeFino | 379/38 |
| 6,130,606 | A | * | 10/2000 | Flick | 340/426 |
| 6,151,657 | A | * | 11/2000 | Sun et al. | 711/103 |
| 6,452,484 | B1 | * | 9/2002 | Drori | 340/426 |
| 6,493,788 | B1 | * | 12/2002 | Sun et al. | 711/103 |

* cited by examiner

Primary Examiner—Van Trieu
(74) Attorney, Agent, or Firm—KC Bean, Esq.

(57) ABSTRACT

A vehicle security system for performing selectable vehicle security functions that are programmable in a wireless manner. The system has a microcontroller controlling a vehicle security interface including at least a siren control unit and a vehicle head/signal light controlling unit. A physically independent remote programming unit is used for transmitting function-programming information to the microcontroller, and a radio receiver is connected to the microcontroller for receiving function-programming information transmitted by the remote programming unit. The remote programming unit includes a switch array for setting up a security function code pattern representing the selected security functions. The remote programming unit also includes a radio transmitter for sending, in an electromagnetic transmission, the function-programming command in a signal string representing the security function code pattern to the microcontroller. The microcontroller stores, in an onboard memory, data identifying the security functions conveyed in a security function code pattern received from the remote programming unit. The programmed functions control the various vehicle security function units. The security system provides an easy function-programming capability without having to remove any system components from the vehicle and without having to use any special and expensive additional equipment.

19 Claims, 14 Drawing Sheets

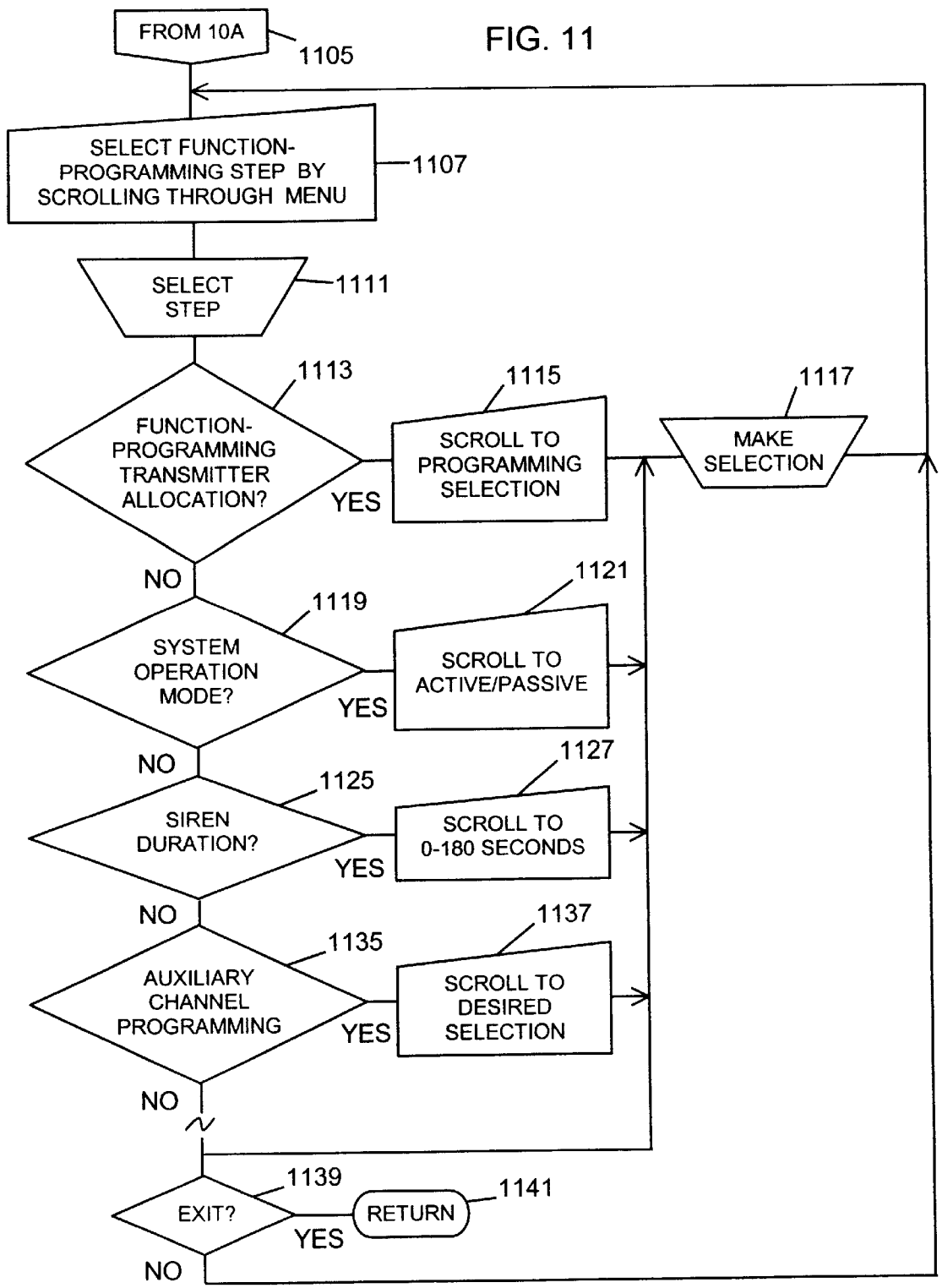

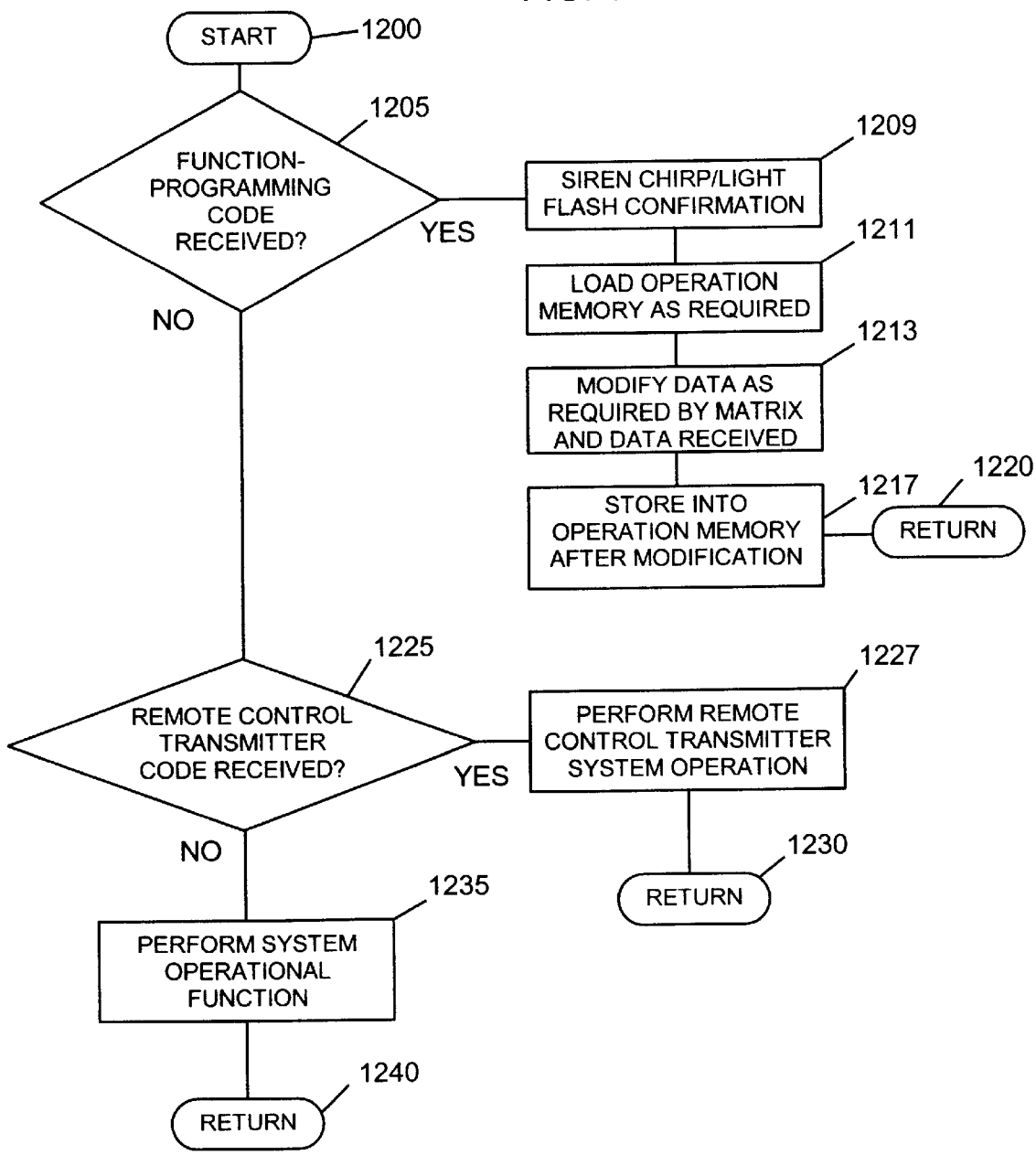

VEHICLE SECURITY SYSTEM HAVING ADVANCED WIRELESS FUNCTION-PROGRAMMING CAPABILITY

CROSS-REFERENCE TO RELATED APPLICATION(S)

Continuation-in-part of U.S. application Ser. No. 09/732,525, filed Dec. 6, 2000, now U.S. Pat. No. 6,452,483, which is continuation-in-part of U.S. application Ser. No. 08/790,954, filed Jan. 29, 1997, now U.S. Pat. No. 6,184,779.

BACKGROUND OF THE INVENTION

1. Field of the Invention

This invention relates to the field of vehicle security systems, and more particularly, to a security system capable of having its functions wirelessly programmed without removing any of its components from a vehicle.

2. Background Art

Security systems are widely deployed for passenger vehicles, and often represent very valuable possessions for ordinary families and small businesses. A typical vehicle security system is incorporated as part of the electronic system of a vehicle and provides a selection of security functions such as intrusion alarm arming and automatic door looking. It can also serve as a user convenience system to aid in the location of a vehicle located in a crowded parking lot or to remotely start the vehicle.

Vehicle security system are generally classified as being either active arming or passive arming systems. In the passive arming category, there are system with or without a door-loking function, systems with or without an arming/disarming chirp, and so on. Similar functional varieties can also be found for active arming systems. Whatever the category, it is desirable to construct the system in a way that allows the functions of the vehicle security system to be programmable by the user. A user of a vehicle security system living in an apartment or near a hospital, for example, may want to turn off the arming/disarming chirp.

As a self-contained electronic system, it is desirable for a vehicle security system to be configured to conform to user decisions about which of the provided security functions should be enabled or disabled. System configuration also includes setting adjustable features, such as the duration of the alarm alert cycle, which are set to suite the environment in which these systems operate or to comply with local ordinances. Thus, when attempting to set up, or program, the functions of a vehicle security system, the design of the interface between the security device and the user becomes important in providing a convenient, successful and efficient security device.

For the purpose of describing the invention, several prior-art vehicle security systems are briefly examined in the following paragraphs with reference to the accompanying drawings. Among the examined security systems, FIG. 1 is a block diagram illustrating the circuit configuration of a conventional system that employs a dual in-line package (DIP) switch array for programming the security functions. The systems of FIGS. 2 and 3 have basically the same circuit configuration, although they employ different function-programming methodologies.

FIG. 1 illustrates a conventional vehicle security system. It includes a microcontroller 30 that controls the security functions of a vehicle. In addition to the microcontroller, the depicted system optionally includes subsystems such as a power door-lock 31, a starter interrupt 32, a light emitting diode (LED) 33, a siren 34, a vehicle light signaling control 35, and an auxiliary output 36. All these subsystems are controlled by the microcontroller 30 for facilitating all the control and status, indicating purposes involved in the security functional operations of the system.

For example, the LED 33 is typically a subsystem installed on the dashboard to display different lighting patterns indicating to the user information concerning the security system status. Additionally, if a security violation event is triggered from outside the vehicle after the security system is armed, the siren control 34 and vehicle light signaling control 35 can be activated in different sounding schemes and head/signal light lighting patterns respectively. These sound and light signals warn about the attempted or achieved intrusion into the guarded vehicle. Further, the auxiliary output 36 can be used to initiate, for example, a radio transmitting device on board the vehicle which can send predefined signal patterns for use in determining the location of the vehicle.

The system outlined in the block diagram of FIG. 1 further includes an ignition switch status indicator 21, a valet/override switch 22, a DIP switch array 23 and a radio receiver 10. The ignition switch status relayed from the indicator 21 is used by the microcontroller 30 to determine the operating state of the entire security system. For example, if the ignition switch of the vehicle is in the normal ON position, and the vehicle is coasting along a road, the security system ignores some of its sensing inputs such as the vehicle body vibrating sensor input.

The radio receiver 10 is used as part of a wireless link, which carries vehicle operator instructions to the vehicle security system. On most occasions, the wireless link is established via electromagnetic signals transmitted from a radio transmitter 12 included in a remote control unit of the vehicle security system. The owner of the vehicle normally carries this remote control unit with, for example, a main ignition switch key of the vehicle.

The DIP switch array 23 in FIG. 1, serves to provide means to program the security functions for the vehicle. One of the conventional programming methods employed for setting up functions provided by a vehicle security system includes setting the ON/OFF states of switches in such a DIP switch array. This DIP switch array is normally installed on the electronic printed circuit board (PCB) of the security device. The block diagram of FIG. 1 schematically illustrates one such system employing this programming scheme. Physical access to the system circuit module is necessary when the vehicle security is installed. Physical access to the DIP switch array is also necessary for each subsequent function adjustment or security device reprogramming. This commonly requires removing the security system module from the vehicle to gain physical access to the DIP switch array. The circuit module must also be opened to expose the DIP switches to a service technician, or the user, to perform the function adjustment and/or the reprogramming.

Since vehicle security systems are designed to provide ever more complicated functions, using DIP switches to set up some, if not all, of these security functions has become a task that cannot be considered easy or straightforward. Adjustment setting in a large array of DIP switches is not an easy task, because each individual switch has to be identified before a setting can be made. Such jobs normally have to be performed by trained service personnel.

If DIP switches are to be used for function setting in security systems with complicated functions, a large number of DIP switches must be used. As a result, system PCB's have to provide a significant amount of valuable board space for these DIP switches. The cost of this increased PCB size and the cost of the DIP switches increase the costs of the vehicle security system hardware.

The use of a remote programmer using electromagnetic transmission signals to overcome the requirement of physical access to the security system module to program functions or features of the system simplifies the process, while eliminating the additional cost associated with the DIP switches and the added PCB requirement. This method uses the remote control receiver of the security system to receive the electromagnetic transmission signals containing the function or feature programming information.

FIG. 2 illustrates a conventional vehicle security system in which a limited number of programming control switches and a wireless transmission are used for programming the security functions. This approach is used to employ the smallest possible number of electrical switches for security system function adjustment and/or reprogramming. It is used in conjunction with a step-by-step procedure. This method is designed to circumvent the necessity of using a large array of switches for the setting of every individual function provided by the vehicle security device.

Normally, by setting the vehicle security system of FIG. 2 to its program mode by properly setting the program switch 24, a user can program all the functions by pressing a small number of control switches on a remote control unit. The remote control unit used for such programming is frequently the unit used for the normal operation of the security system. The design of the entire vehicle security system allows the normal remote control unit to become the programming unit automatically when the system module is set to the program mode.

Essentially, this is a step-by-step scheme in which all the function-setting options are sequenced for user selection and setting. A user has the opportunity to set each and every function of the security system as he or she steps through the entire cycle. One obvious disadvantage of this scheme, however, is that the user frequently misses a step. Frequently, it is forgotten which step is associated with a particular function to be set or adjusted. Sometimes, even when the step counting is correct, a function whose setting has been passed is desired to be altered. The entire stepping cycle will then have to be sequenced again. Although relatively simple hardware can be set up to implement such a straight forward rotating function-programming or function-setting scheme, such a scheme does not meet today's user-friendliness standard and efficiency.

Still another conventionally known vehicle security system function-programming scheme involves the use of a controlling host computer. The host computer used may be, for example, a popular IBM-compatible PC, which is coupled via a suitable electronic interface to the vehicle security system for implementing the functions setting. This has the advantage of user-friendliness since a graphic user interface (GUI) can be adopted for human interface.

FIG. 3 shows an example of a conventional arrangement for implementing a programming scheme that includes the use of an external computer. The system illustrated in the block diagram of FIG. 3 incorporates a host computer system 37 that serves to control the function-programming procedure in a security system via the wired interface 25. Although this scheme provides better flexibility in the process of function selection and setting, a direct wired connection of the circuit module to the host computer is necessary. Before the connection to the host computer is made, the circuit module of the vehicle security system has to be removed from the vehicle and taken to the location where the host computer resides. On most occasions, only vehicle service shops have the necessary interface between the host computer and the vehicle security system. As a result, the convenience of the programming interface is not directly accessible to the installer of the security system at the vehicle.

Additionally, there are hand held programmers that can be taken to the vehicle to implement function or feature programming of the security system, but these systems still require a directly wired connection from the programmer to the security system control module. This is accomplished by gaining access to the security system control module or by installing programming wiring at the time of installation of the security system control module to which the programmer is connected to program the system. The function-programming cable would be an additional expense for every system installed; therefore the end user would have to pay an additional cost for the convenience.

The object of the instant invention is to overcome the deficiencies of the all the above listed devices. This is done by using a remote programmer using electromagnetic transmission signals to program the functions or features of the security system by using the remote control receiver that is already built into the remote controlled security system. This does not add any additional cost to the security system; only a change in the system controller programming is required. The remote programmer can be a 1-way or 2-way system.

Another object of the instant invention is to provide a 1-way remote programmer that can program one or more of the programmable functions or features the security system without knowing how the balance of the programmable functions or features is programmed. This capability overcomes a deficiency of the prior art, in that they had to program all of the function or feature programming information to change one programmable function or feature or that only one function or feature could be programmed at a time. This feature of the remote programmer comprises ability to transmit via a 1-way transmission; function-programming code, a base unit identifier, a matrix identifying the function(s) or feature(s) to be changed, and the change data to change the programming of the identified function(s) or feature(s) and the ability of the base system to decode the programming indicia and data information, and store the changes in memory to dictate the behavior of the base controller's functions or features.

SUMMARY OF INVENTION

To overcome the deficiencies of the prior art; a remote programming device and method using wireless electromagnetic transmission signals to program the functions or features of a security system remotely without any direct physical access to the security system is described. The device programs the security system using a method of setting up the programmable functions or features with a remote wireless programmer, transmitting the function-programming data via a wireless link and by using the remote control receiver that is integrated into the security system. This does not add any additional cost to the security system; only a change in the system controller programming is required. The remote programmer device can be a 1-way or 2-way system. The 2-way remote programmer can only be used on security system with a transceiver already built in without adding any cost the security system.

The present invention descibes a remote programming device for a vehicle security system for performing selectable vehicle security functions that are programmable in a wireless manner. The system has a base controller for controlling a vehicle security interface, which includes an auditory alarm device, preferably a siren control unit and siren, and a vehicle light control unit. A physically independent remote programming unit as disclosed is used for transmitting function-programming settings to the base controller, and a wireless signal receiver is connected to the base microcontroller for receiving wireless signal function-programming information transmitted by the remote programmer. The remote programmer includes user operable control switch(es) for setting up a security function code pattern representing selected security function or feature information. The remote programmer also includes a wireless (electromagnetic) signal transmitter for sending, in a wireless transmission, the function-programming commands in a signal string representing the security function code pattern to the base controller. The base controller stores or programs, into an onboard non-volatile memory, data identifying the security functions or features specified by the security function code pattern received from the remote programmer. The base controller controls vehicle security functions according to the data stored in the onboard memory to dictate the behavior of the base controller's functions or features.

The present invention further provides a method of wireless function-programming for setting a plurality of security functions in a vehicle security system. The vehicle security system has a base controller for controlling a number of various vehicle security functions, a remote programmer for programming function-programming indicia and data and for transmitting function-programming information to the base unit. The base unit includes a wireless (electromagnetic) signal receiver for receiving function-programming information transmitted by the remote programmer. The method includes the steps of setting up a security function code pattern representing the selected security functions in the remote programmer. The remote programmer then sends, in a wireless transmission signal, a function-programming command in a command signal string including the security function code pattern to the base microcontroller. The security functions specified by the security function code pattern received from the remote-programmer are then stored or programmed into the base unit for controlling the various vehicle security functions.

The above mentioned 1-way remote programmer system comprises a power source, a transmitter, a controller, user operable control switch(es), a memory or memories, a display, a display driver, and an enclosure. The power source comprises a battery or batteries for a hand held programmer, a laptop personal computer (PC), or a personal digital assistant (PDA); an AC source for a personal computer; and a power supply or supplies (regulator(s), to regulate and supply the appropriate voltages and currents) to power the remote programmer. The transmitter comprises an oscillator, amplifier/driver, and antenna. The oscillator and amplifier/driver can be combined into one circuit to simplify its construction. The controller comprises a microcontroller, a microcomputer, a personal computer (both PC and laptop), a personal digital assistant (PDA), or any other control device that can be programmed, permanently store data in non-volatile memory, and used to control the operation of the remote programmer operations. The control switches comprise DIP switches, push button switches, scrolling wheel devices with or without an internal switch, toggle switches, rocker switches, or any other type of switch(es) that can used to set up the programmable functions or features and activate the transmitter to transmit function or feature programming information data. The memory comprises one or more of the following; instruction (non-volatile) for storing the control program, program (non-volatile) for storing function or feature programming information, random access (volatile) for operating registers, buffers, etc. that are used for temporary storage of program control information and data, and any other volatile or non-volatile memory devices that can be used to store operational programming, security system programming data, and display information. The memory may or may not be integrated into the controller. The display driver can be integral to the controller or can be a separate driver with its own power supply (in case of an LCD display, the supply would boost the voltage to operate the LCD display back lighting). The display comprises one of the following; LCD (liquid crystal display), CRT (cathode ray tube), LED (light emitting diode), and any other type of display that can be used to display the function or feature programming information, using a graphical or non-graphical display. The enclosure can be the same enclosure as the controller in case of a personal computer or PDA, where the remote programmer is a plug in transmitter card or module with the host supplying the power, controller and operating program, control switches, memory, display, and display driver. For a unique or separate remote programmer, the enclosure would house all of the components of the remote programmer.

The 2-way remote function or feature programmer additionally comprises a receiver in the remote programmer and a transmitter in the base system being programmed. This allows 2-way communication between the remote programmer and the base unit, since both units have transceivers. The 2-way communication allows the remote programmer to request current function or feature programming data from the base system, modify the current function or feature programming data to update it as requested and/or desired, retransmit the updated function or feature programming indicia and data to the base system allowing the base system to store the updated function or feature programming information to dictate the behavior of the base system's controller functions or features.

Therefore it is an object of the present invention is to provide a vehicle security system for having a wireless function-programming capability and method that is easy to use in implementing the programming of the security system functions or features.

Another object of the present invention is to provide a vehicle security system having a wireless function-programming capability and method that does not require the removal of any of the system's components from the vehicle to implement the programming of the security system functions or features.

Still another object of the present invention is to provide a vehicle security system having a wireless function-programming capability and method that does not require the use of additional costly equipment to implement the programming of the security system functions or features.

Yet another object of the present invention is to provide a vehicle security system having a wireless function-programming capability and method that is inexpensive to build.

Another object of the instant invention is to provide a 1-way remote programmer and method that can program one or more of the programmable functions or features a security system without knowing how the balance of the programmable functions or features are programmed. This capability overcomes a deficiency of the prior art in that they had to program all of the function or feature programming information to change one programmable function or feature. This feature of the remote programmer comprises ability to transmit via a 1-way transmission; a security system base unit identifier, a function-programming matrix identifying the function(s) or feature(s) to be changed, and the change data to change the programming of the identified function(s) or feature(s) and the ability of the base system to decode the programming indicia and data, and store the changes in memory to dictate the behavior of the base controller's functions or features during future operations.

One embodiment of the present invention provides a method and system for programming a base unit set with a remote programmer by downloading at least one user selectable command string from a remote programmer to the base unit via a wireless link, where the remote programmer comprises a remote controller, a memory capable of storing a representation of said at least one user selectable command string; user operable switches that can be used to modify the numeric values stored in the memory; a display, and transmitter that can transmit the command string to the base unit; and A base controller comprising: a microcontroller; and a instruction memory that holds instructions that cause the controller to determine whether or not a function-programming request code is received, store the user selectable command string in a non-volatile memory, and if the controller is not in the process of function-programming, to determine whether a security event has occurred, and if so, initiate an alarm function.

These and other objects of the present invention are readily apparent from the following detailed description of the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein:

FIG. 11 is a flow chart for the operating program in the remote programmer that uses the minimum of control inputs to scroll through the menu and select the correct data to modify a set of functional-programming data, and FIG. 12 is a modified version of FIG. 7 to show the additional steps required to perform matrix (one or more changes) function-programming in the base controller.

DETAILED DESCRIPTION

The present invention provides a system for wireless function programming of a vehicle security system. One embodiment of the invention is illustrated in the circuit block diagram of FIG. 4.

Figure 1:
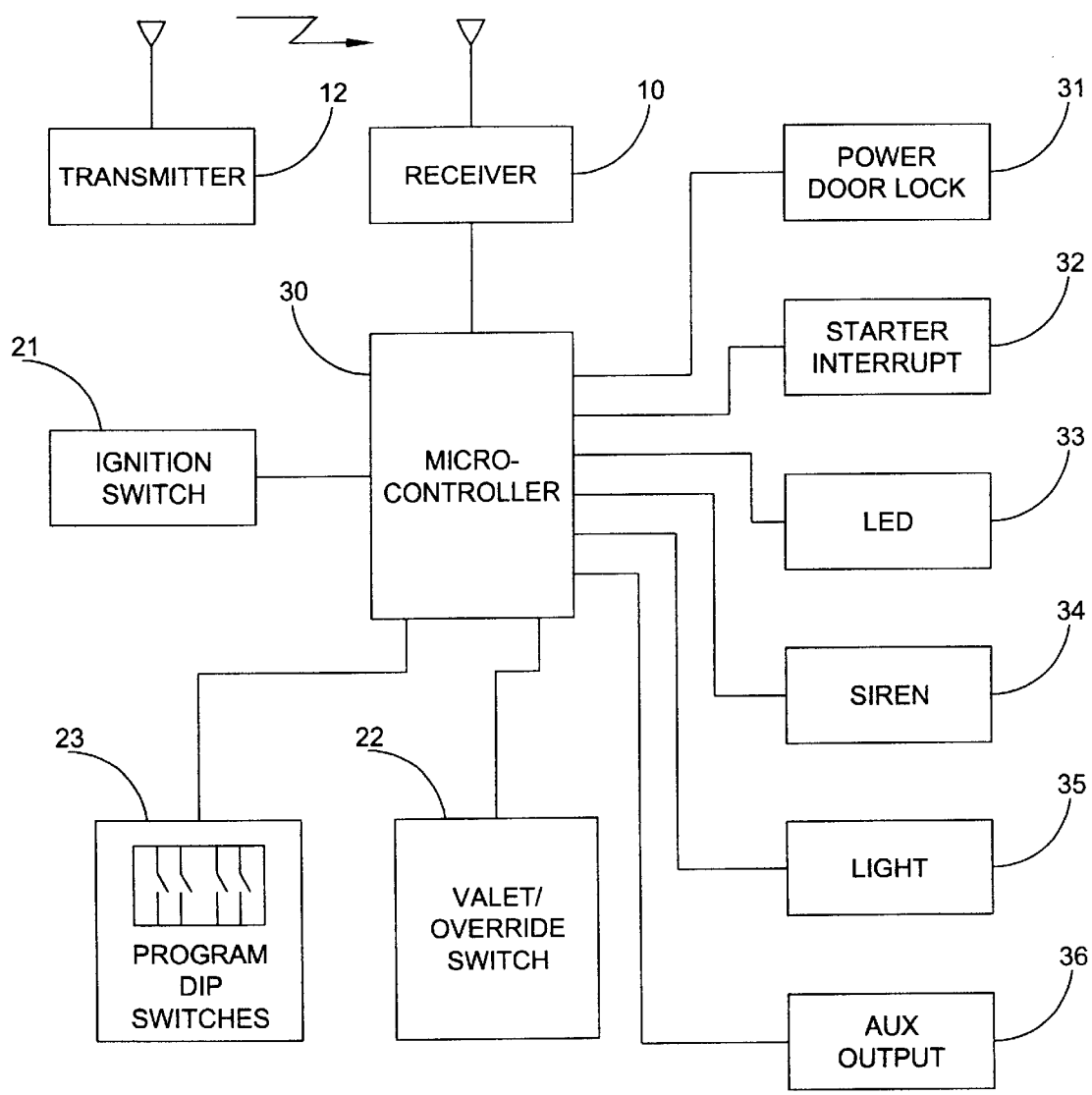
FIG. 1 is a block diagram illustrating a circuit of a prior art vehicle security system employing a DIP switch array for programming security functions.
Figure 2:
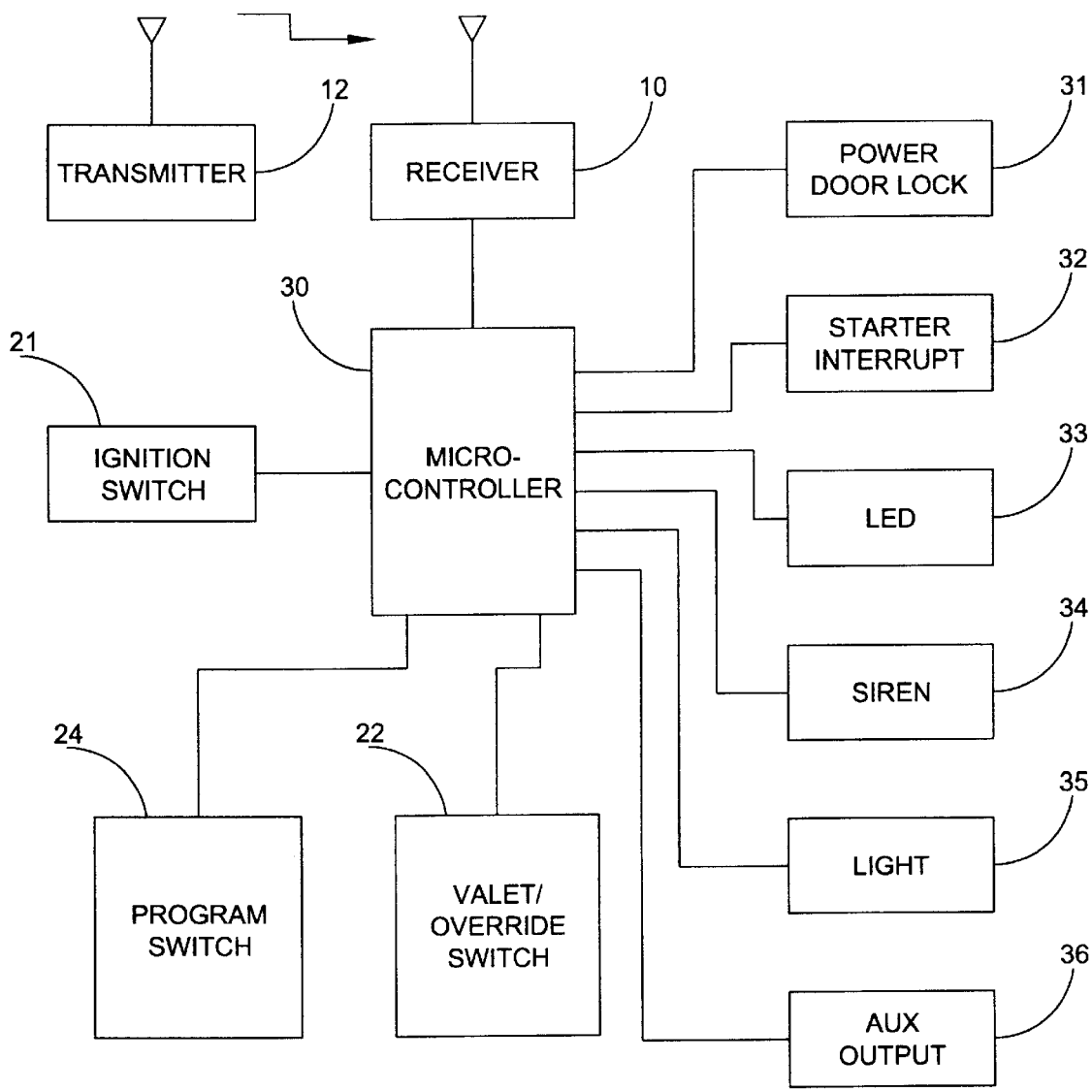
FIG. 2 is a block diagram illustrating a circuit of a prior art vehicle security system employing a step-by-step rotating scheme for programming security functions.
Figure 3:
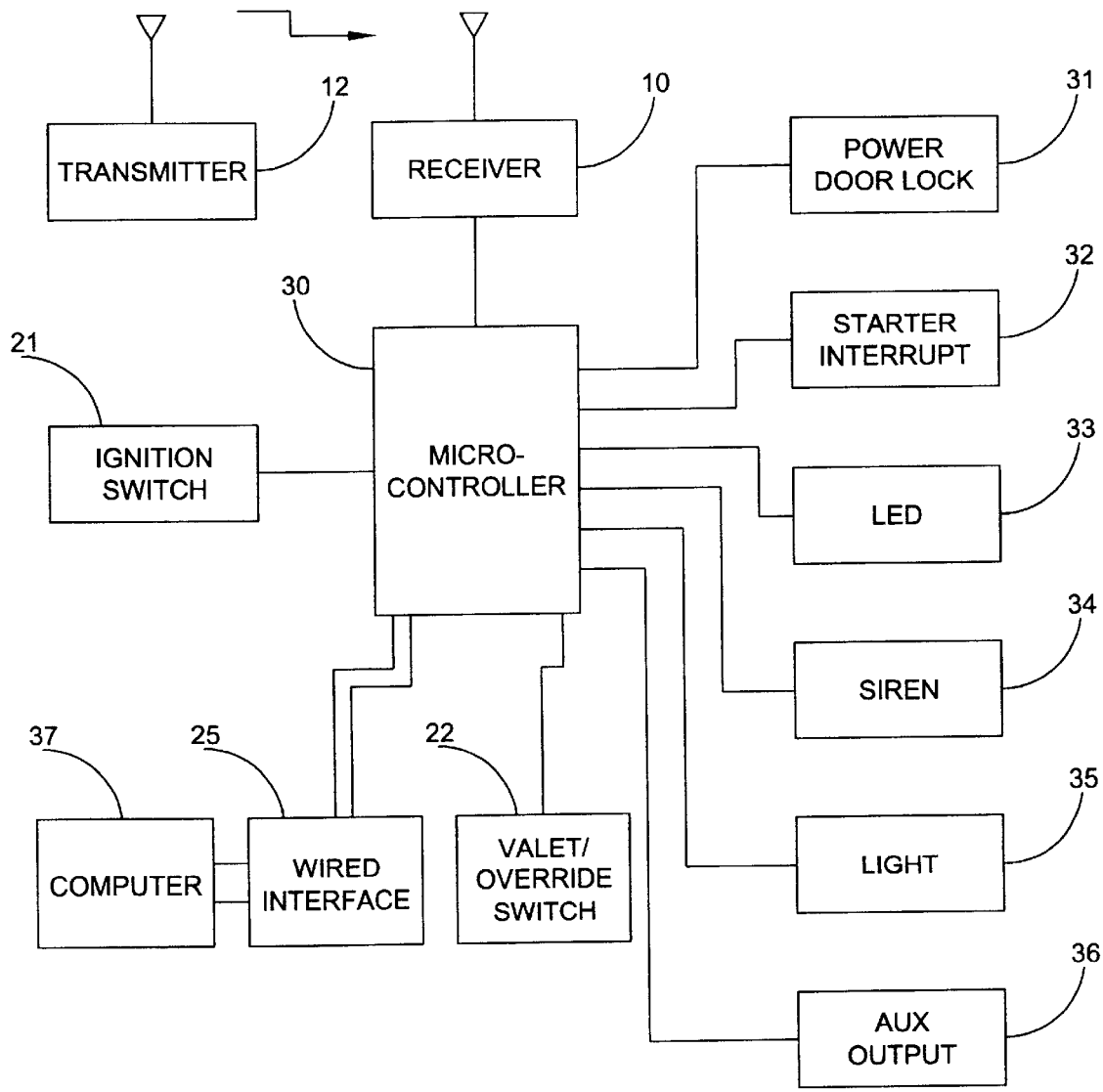
FIG. 3 is a block diagram illustrating a circuit of a prior art vehicle security system employing a host computer system directly connected by wires to the system for controlling the programming of security functions.
Figure 4:
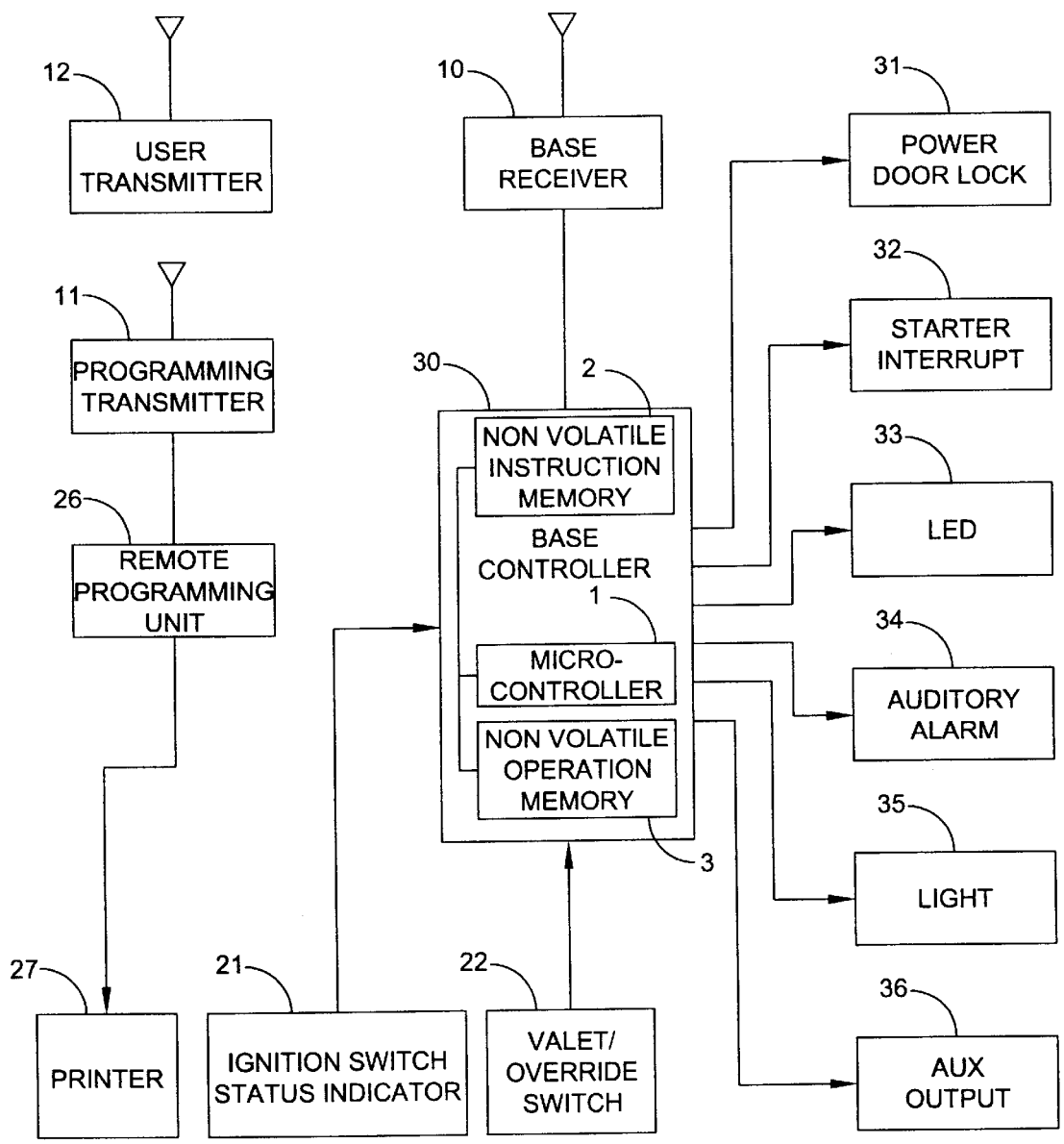
FIGS. 4, 4A are block diagrams of the circuit configuration of a vehicle security system that employs wireless function-programming.

FIG. 4 illustrates a vehicle security system that includes a base controller 30, which normally includes software to perform the system functions that controls the security system functions for a vehicle. Base controller 30, includes a microcontroller 1, capable of following a predetermined sequence of programmed steps. These steps can include decision steps that affect which steps are taken subsequently. As is well known in the art, such a device can be implemented with a commercially available microcontroller, a general-purpose microprocessor, an imbedded microprocessor, state machine or logic array. Base controller 30, also includes a non-volatile instruction memory 2 that holds a sequence of commands or steps that the microcontroller follows. Certain microcontrollers have such memory included within their design. One skilled in the art will recognize that separate memory devices could also be used, such as an Erasable Programmable Read Only Memory (EPROM). In the case of a microcontroller embodied in a logic array or state machine, such devices could be constructed in a way such that the desired instructions are inherent in the design of the device instead of embodied in a separate, identifiable memory.

When installed, base controller 30, is connected to controllers, sensors, indicators, and actuators in a vehicle. In the embodiment shown in FIG. 4, it is connected to a power door-lock unit 31; a starter interrupt 32 that can prevent the vehicle from being started; one or more light-emitting diodes (LED) 33; an auditory alarm 34; a vehicle light signaling control 35; and an auxiliary output 36. The power door-lock unit 31 comprises a door lock output (positive, negative, or positive and negative) and a door unlock output (positive, negative, or positive and negative). The starter interrupt 32 comprises a ground when armed output, a ground when armed with ignition output, and/or an onboard relay to interrupt the starter circuit. The light emitting diodes (LED's) comprise LED's to indicate system operation to the user and others (flashing LED is a theft deterrent). The auditory alarm 34 comprises one or more of the following outputs: siren, horn, piezo, speech, or any other auditory device. The vehicle light signaling control 35 comprises one or more of the following outputs: head lights, running lights, turn or emergency signal lights, dome lights, courtesy lights, strobe lights, or any other vehicle lighting device. The auxiliary output 36 comprises one or more of the following output(s) (there can be several auxiliary outputs) capabilities: predetermined pulse length, validity (the output in on as long as a valid remote control transmission is received), latch (turned on and off with alternate remote control transmissions), latched on reset with ignition on, timed (output on for a predetermined time period (30 seconds for instance)), or any other type of controlled output.

In one embodiment, a LED is installed on a vehicle dashboard and displays different lighting patterns indicating to the driver information regarding the system status. If a security violation event is triggered from outside the vehicle after the system is armed, the auditory alarm is activated in different warning sound schemes, and the vehicle light signaling control causes the vehicle head lights and signal lights to turn on and off in different signaling patterns.

Figure 4A:
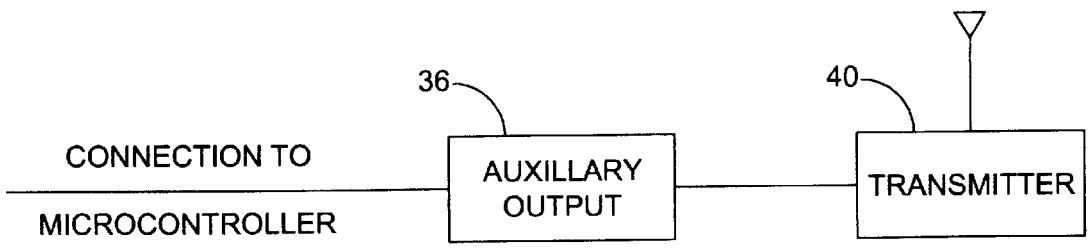

In one embodiment the auxiliary output provides a way to activate other devices that would be useful in a security violation event. As shown in FIG. 4A, radio transmitter 40 onboard the vehicle, can send location coordinates using radio signals for tracking the location of the vehicle, when used in conjunction with a global positioning system (GPS) or equivalent.

The system outlined in FIG. 4 further includes an ignition switch status indicator 21, and a valet/override switch 22. The ignition switch status is relayed from the indicator 21 to base controller 30, to determine the operating state of the entire security system. When the ignition switch of the vehicle is in the normal ON position, and the vehicle is being driven along a road, a status signal from the indicator 21 allows the security system to properly control the entire security system. The system may be instructed to ignore some of its sensing inputs, for example, such as a vehicle body vibrating sensor input (not shown), since the vehicle is being driven. The valet/override switch 22 status is relayed to base controller 30, to determine the mode of the alarm and to provide programming control to place the security system into the programming mode and to provide a control input while the alarm is in the program mode. This switch provides a way of instructing the alarm not to arm while in the valet mode. This allows the user/owner to place the system into the valet mode for servicing or valet parking.

The alarm system can be adjusted to use either the auditory alarm or the lights, or both, to warn of an attempted or achieved intrusion into the guarded vehicle. The behavior of the system's functions are determined by a set of values stored in the operation memory 3, which is a non-volatile programmable memory connected to the microcontroller. These values represent a string of commands selected by the installer or user to control the alarm system. An example of such a memory is an electrically erasable programmable read only memory (EEPROM). The operation memory could also be implemented with flash memory or a typical random access memory, with a semi-permanent power supply, such as a long life battery connected to base controller 30. In one embodiment, the instruction memory 2 and operation memory 3 are embodied in the same device, such as two separate sectors of a single Flash EPROM that could be independently programmed.

Base controller 30, is also connected to a radio receiver, base receiver 10. The base receiver is used to complete a wireless link to receive operator instructions for normal operation of the security system as well as those for programming the security functions. As one skilled in the art would recognize, the base receiver could be packaged in the same chassis as base controller 30, When the system is under control of the user transmitter 12, a wireless link is established via electromagnetic signals transmitted from the user transmitter. This remote control unit includes a small radio transmitter, and is carried by the owner of the vehicle with, for example, the main ignition switch key of the vehicle. The user transmitter can be used to relay normal use signals to base controller 30, of the system, such as those regarding intrusion alarm arming, automatic door locking and convenience functions such as remote starting of the vehicle.

Figure 4B:
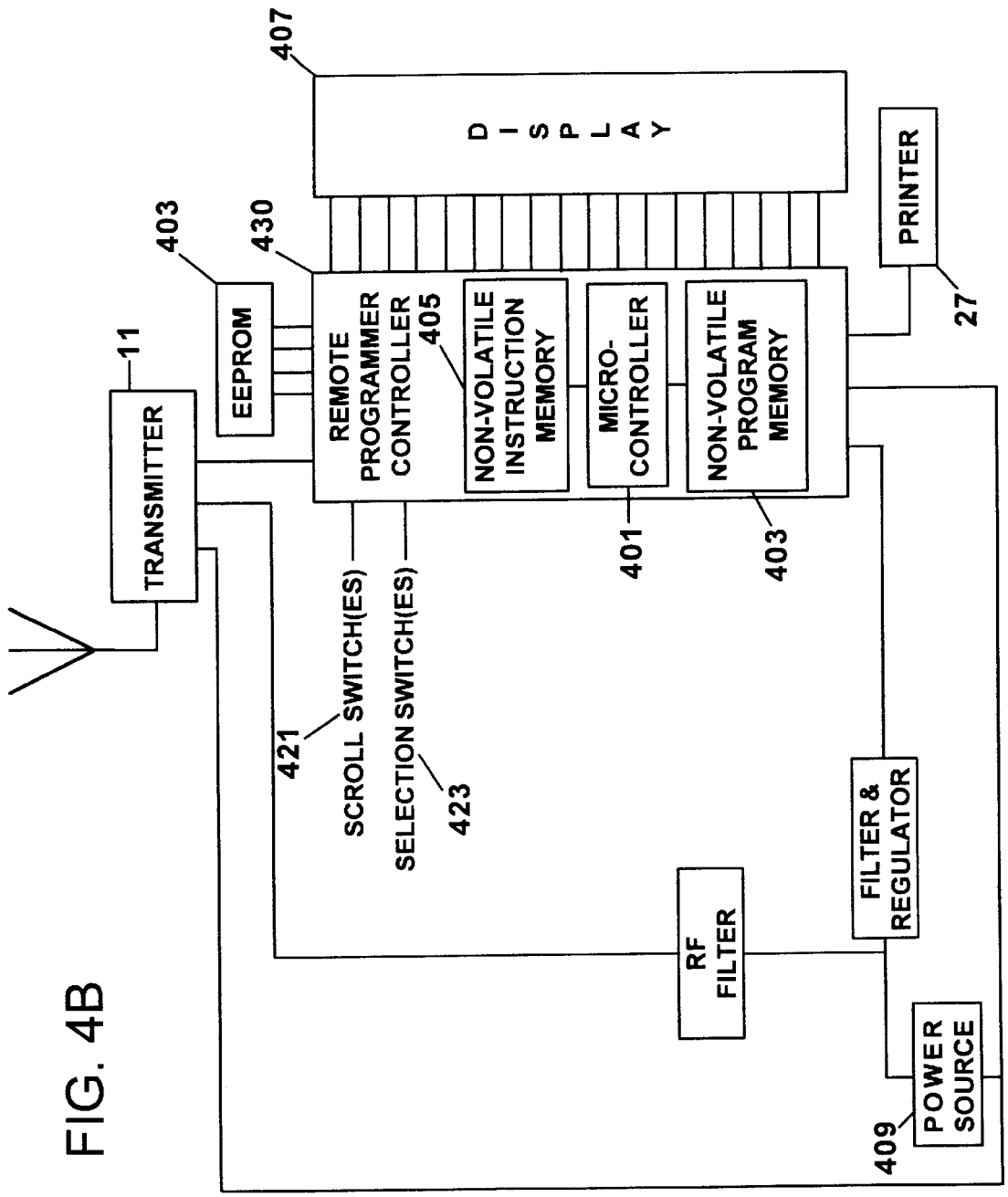
FIG. 4B is a block diagram of an embodiment of a complete remote programming unit.

FIG. 4B shows remote programming unit 26 in the system is used to generate function-programming signals for the security system. The remote programming unit 26 is connected to programming radio transmitter 11, the circuitry for which is well known in the art. In one embodiment of the invention, printer 27 is connected to the remote programming unit 26. This printer can be used to record the setting of the security functions, in effect becoming a data logger. A storage device, such as a memory with self-incrementing address circuitry could also be used as a data logger. This information can be relayed to the printer at, or not at, the same time the transmission of programming information is underway. As should also be readily understood, the interface to the printer device may optionally meet any of the popular electronics communications equipment standards, such as RS-232C.

Power source, 409, in FIG. 4B supplies power to remote programming unit 26, that includes transmitter 11, using power and RF filters, and regulators. Printer 27, shown directly attached to remote programming unit controller 430, but it can be attached with a connected with a connector or any other method. Printer 27 is less important in this embodiment, since the function-programming data for a large quantity of units can be stored in non-volatile program memories 403 (internal non-volatile program memory 403 and/or external electrically erasable and programmable read only memory 403), for use later or to review the function-programming settings for a particular system. Additionally, a default function-programming menu for any unit that is to be remotely programmed is stored in said memory 403. Any type of non-volatile programmable memory can be used for said memory 403. Controller 430, as shown, comprises internal non-volatile instruction memory, 401, that includes all the software instructions in storage to perform all the operations of remote programming unit 26. The controller microcomputer/microcontroller 401 contains operating registers, random access memory (RAM), inputs, and outputs; and runs the programs stored in said memory 401, to perform all the required operations of remote programming unit 26. There can be one or more user operated scroll switches, 421, that are used to scroll through the information displayed on display 407, to make the proper selections using one or more user operated selection switches, 423. A single user operated scroll wheel, with an internal user operated switch can be used to perform all the manual input operations required by user operated scroll switches 421, and user operated selection switches 423.

Many packaging alternatives exist for this system. The programming transmitter could be packaged in the same package as the remote programming unit, or in a separate chassis. The remote programming unit and transmitter can be packaged with the user transmitter or as a separate unit. Furthermore, a single transmitter can be used to relay function-programming signals and normal use signals to base controller 30, of the system.

The above mentioned 1-way remote programmer system comprises a power source, a transmitter, a controller, user operable control switch(es), a memory or memories, a display, a display driver, and an enclosure. The power source comprises a battery or batteries for a hand held programmer, a laptop personal computer (PC), or a personal digital assistant (PDA); an AC (alternating current) source for a personal computer; and a power supply or supplies (regulator(s), to regulate and supply the appropriate voltages and currents) to power the remote programmer. The transmitter comprises an oscillator, amplifier/driver, and antenna. The oscillator and amplifier/driver can be combined into one circuit to simplify its construction. The controller comprises a microcontroller, a microcomputer, a personal computer (both PC and laptop), a personal digital assistant (PDA), or any other control device that can be programmed with software to perform the remote programmer operations, and permanently store data in non-volatile memory. The control switches comprise DIP switches, push button switches, scrolling wheel devices with or without an internal switch, toggle switches, rocker switches, or any other type of switch(es) that can used to set up the programmable functions or features and activate the transmitter to transmit function or feature programming information data. The memory comprises one or more of the following; instruction (non-volatile) for storing the control program, program (non-volatile) for storing function or feature programming information, random access (volatile) for operating registers, buffers, etc. that are used for temporary storage of program control information and data, and any other volatile or non-volatile memory devices that can be used to store operational programming, security system function setting indicia and data, and display information. The memory may or may not be integrated into the controller. The display driver can be integral to the controller or can be a separate driver with its own power supply (in case of an LCD display, the supply would boost the voltage to operate the LCD display back lighting). The display comprises one of the following; LCD (liquid crystal display), CRT (cathode ray tube), LED (light emitting diode), and any other type of display that can be used to display the function or feature programming information, using a graphical or non-graphical display. The enclosure can be the same enclosure as the controller in case of a personal computer or PDA, where the remote programmer is a plug in transmitter card or module with the host device supplying the power, controller and operating program, control switches, memory, display, and display driver. For a unique or separate remote programmer, the enclosure would house all of the components of the remote programmer.

The 2-way remote function or feature programmer additionally comprises a receiver in the remote programmer and a transmitter in the base system being programmed. This allows 2-way communication between the remote programmer and the base system. The 2-way communication allows the remote programmer to request current function or feature programming information from the base system, modify the current function or feature programming information to update it as desired, retransmit the updated function or feature programming information to the base system allowing the base system to store the updated function or feature programming information to dictate the behavior of the base system's controller functions or features.

The command string transmitted from the remote programmer to the base unit comprises a function-programming command and function setting information. The function-programming command comprises one of a remote control transmitter code, a separate type of code word, but similar to a remote control transmitter code word, and a completely different transmission command code word. Any of which is predetermined, programmed into the base units, and recognizable by the base units. One method of programming can be to preset all the required function-programming information of a base unit, transmit with a pre-programmed remote control transmitter and immediately transmit command string comprising a short abbreviated function-programming command and the function setting information. Another method would be to use a known or pre-programmed remote control transmitter code word as the function-programming command word, followed by the function setting information. The function setting information comprises a base unit identification data, transmitter allocation data, function-programming menu matrix, and function-programming data. The base unit identification data, transmitter allocation data, function-programming menu matrix and any other data used to determine how the function programming data is manipulated and stored in the base unit's operation memory to dictate the behavior of the base controller's functions is hereafter referred to as function setting indicia.

In one embodiment of the invention, the remote programming unit and programming transmitter are embodied in a hand-held, battery operated device. The device contains a microcontroller and instruction memory as described for base controller 30. The device also contains a non-volatile programming memory. The programming memory holds sets of values (function-programming menus) that describe possible configurations for base controller 30, function-programming control data. The new modified/altered values held by the temporary memory can be transmitted to base controller 30, and, loaded into the operation memory of base controller 30, to dictate the behavior of base controller 30's functions. In one embodiment, the new values overwrite the original values (i.e., any values existing just prior to the reprogramming.), and in another embodiment, the old values are read from the operation memory, modified, altered, or manipulated by base controller 30, according to the function setting indicia and function-programming data received, and then stored back into operation memory as a complete set of function-programming control data to dictate the behavior of base controller 30, functions. This embodiment allows the installer or user to change one or more function-programming features without knowing how the balance of the system function-programming features are set.

The values in the temporary of programming memory can be altered by the installer/user of the remote programming unit. In one embodiment, a binary memory location is allocated for the "arming mode" feature of a vehicle alarm. A binary value of 0 stored in that location indicates that the active arming mode is selected, and the system can only be armed and disarmed with the remote control transmitter. A value of 1 stored in that location indicates that the passive arming mode is selected, and the system will arm passively after a predetermined time period (exit delay), that is after the ignition is turned off and at least one door is opened and closed. A liquid crystal display is used to display the names of the installer/user settable features and the corresponding value for that feature in the temporary or programming memory. The meaning of the value could alternately be displayed. The word "passive" could be displayed next to "arming mode" on the display, for example, if the value in the arming mode location of the programming memory is 1.

In one embodiment, buttons or scroll wheels on the face of the controller allow the user to scroll up and down through a list of programmable features and their settings as represented in the temporary or programming memory. Another button or switch on the scroll wheel is provided to allow the user to alter the value in the temporary or programming memory and consequently, to display the new status of that location on the display. Another button or the same button or switch (select the transmit mode while scrolling through the menu) is provided to cause the remote programming unit to transmit the data in the temporary or programming memory to base controller 30, for storage in the operation memory.

In another embodiment, the remote programming unit is embodied in the combination of software and a personal computer capable of running the software. The computer can be used to serve the functions described for the microcontroller, instruction memory, and programming memory of the hand-held unit above. The user interface of the personal computer can be used to perform the functions of the display and buttons of the hand-held unit embodiment. An application with a graphical user interface, such as those of programs made for the Microsoft WINDOWS® operating system could be used to make the program easy to use.

Figure 5:
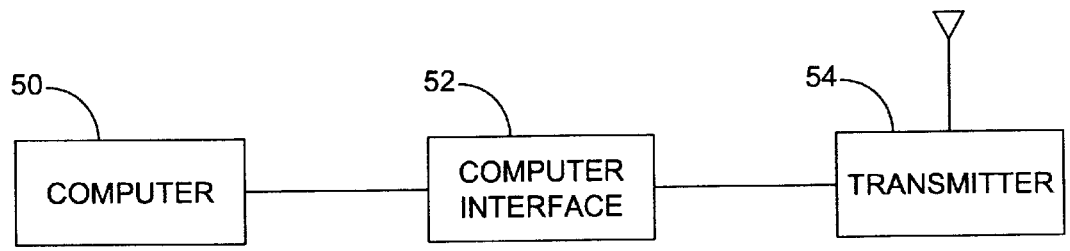
FIG. 5 is a block diagram of an embodiment a remote programming unit attached to a computer.

FIG. 5 shows a block diagram of such an embodiment. A transmitter 54 packaged as a personal computer peripheral can be connected to the computer 50 to perform the function of the programming transmitter 11 of FIG. 4. The computer and transmitter can be connected through the computer interface 52, which can be an RS-232 connection to the computers serial port, USB port (universal serial bus) or it can be a connection to the computer's parallel port. Alternately, the transmitter could be placed on a printed circuit card and the computer interface could be embodied by peripheral expansion busses known in the art, such as Industry Standard Architecture (ISA), Extended Industry Standard Architecture (EISA), or Peripheral Component Interconnect (PCI). These embodiments describe a peripheral unit with a minimal amount of circuitry. As is well known in the art, more functionality can be added to the computer peripheral described by placing a programming memory and controller/microcontroller on the peripheral although those functions can be performed by the personal computer at a lower expense of construction.

One skilled in the art would also recognize that the invention could be embodied in by adding an appropriately packaged transmitter to any device with a user interface, processing functionality capable of performing the functions of the controller/microcontroller, instruction memory and programming memory of the hand-held unit described above and an expansion port. The transmitter could, for example, be placed on a PC Card, which is a credit card-sized device for use with a lap-top computer with Personal Computer Memory Card International Association (PCMCIA) expansion ports. A similar device could be created for use with a hand held personal digital assistant (PDA).

While FIG. 4 shows base receiver 10, in use for receiving commands sent by the user transmitter 12, and from the programming transmitter 11, a person skilled in the art will recognize that separate radio receivers could be used to receive instructions from each of these two sources.

The wireless transmission link between the programming transmitter 11, the base receiver 10, and user transmitter 12 may use any radio frequencies and modulation techniques commonly known in the art for data transmission. Examples of modulation techniques that would work include Pulse Width Modulation (PWM), Pulse Position Modulation (PPM), Phase Shift Keying (PSK), Frequency Shift Keying (FSK), Amplitude Modulation (AM) and Frequency Modulation (FM). It should also be noted that the wireless transmissions need not travel directly between the programming transmitter 11, or user transmitter 12 and the base receiver 10. Transmissions may be repeated through any wireless repeater such as pager networks, cell phone networks, or satellite services. The wireless link may also be established using electromagnetic signals, which are in the infrared range of frequencies and, which serve the same purposes, but would require a receiving head (infrared detector or receiver) external from the control module that is visible to the installer/user.

Figure 6:
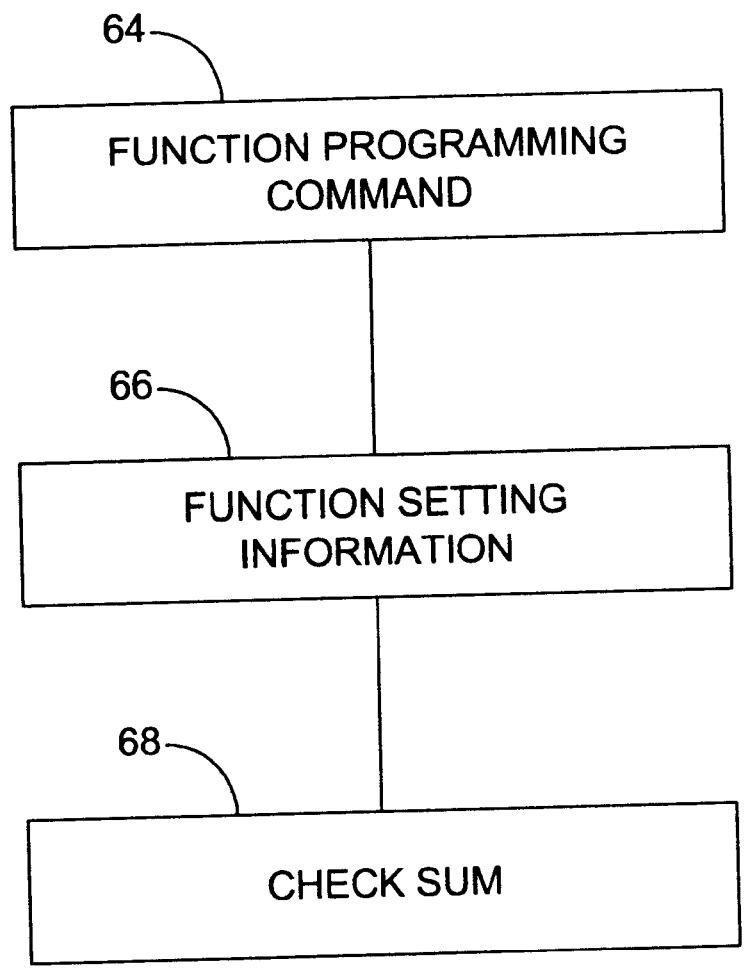
FIG. 6 is a block diagram outlining the format of a wireless signal transmitted by a remote programming unit of the vehicle security system.

FIG. 6 describes a possible format of the data transmitted by remote programming unit 26 of FIG. 4. In one embodiment of the vehicle security system, the data transmitted by the function-programming signals are divided into three types of data. One comprises a function-programming command section 64; there is also a function-setting information section 66, and a check-sum section 68. The function setting information may or may not contain control information to determine if the function setting indicia data is only for the last remote control transmitter used or is global (for all remote control transmitters programmed into the security system). This would come into play if the normal user of the security system uses active arming and the spouse user likes passive arming, etc. As persons skilled in the art should be aware, these three sections can be transmitted in any order. This order is predetermined in advance, however, and base controller 30, is preset to expect the order and format that the remote programming unit is preset to send.

The function-programming command section may contain an identification code that is unique to base controller 30, and its associated remote programming units and user transmitters. This can prevent accidental, unintentional, or intentional reprogramming of base controller 30, by remote programming units other than those of the security system installer or in some cases, the vehicle owner, this in cases where the owner has the knowledge and ability to reprogram the security system, and wants to pay the extra expense of buying a remote programmer. To provide for additionally security in programming a security system, command string comprising the function-programming command and the function setting indicia and data transmitted by the remote programmer is normally transmitted within 3 seconds of a transmission from a system remote control transmitter. To further secure the programming of the security system, it would be appropriate to place the system being programmed into the function-programming mode. This would also remove the possibility of programming other systems that are programmed to use the same remote control transmitter as the security system being programmed.

In one embodiment, the function-programming command word identification code is changed in a predefined way after each successful transmission for security purposes. This could foil a thief's attempt to receive and store the identification code transmitted by the vehicle function-programmer's remote programming unit and retransmit of the same code at a later time in an effort to alter the settings of the base microcontroller. In another embodiment, base controller 30, waits a certain length of time after an incorrect function-programming command word identification code is received before it will accept the correct identification code. This hinders malicious attempts to cycle through all possible identification codes in attempt to find the correct one.

In another embodiment, the data sections are sent together in a packet which is encrypted with a function-programming command word identification code known to all the associated units. Transmissions will only be heeded if they are encoded with the correct code.

Figure 7:
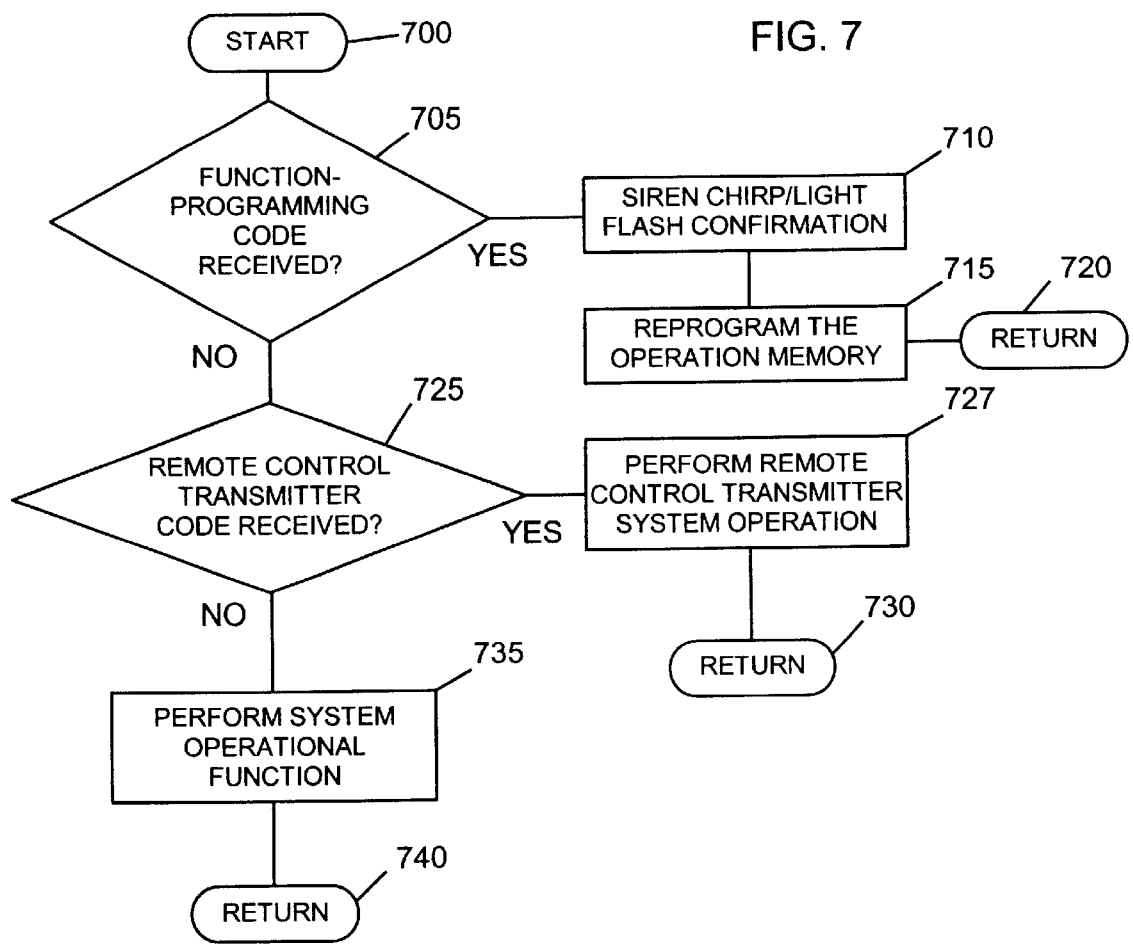
FIG. 7 is a flow diagram illustrating some of the steps executed by a base microcontroller.

FIG. 7 is a flow diagram illustrating steps executed by the microcontroller of base controller 30 of the vehicle security system depicted in FIG. 4. These commands or steps, stored in the base instruction memory, are followed by the base microcontroller in monitoring the activities in the vehicle security system, and also in modifying the contents of operation memory. Essentially, the program can be a recursive routine, starting from the program start step, concluding at a program return step, and then recycling.

For example, base controller 30, of the system of FIG. 4 starts the routine of FIG. 7 at the start step 700. At step 705, the system determines whether or not a function-programming request code is received. If the system is requested by the user to implement a function-programming operation, the routine continues at step 710, where the auditory alarm can be driven to sound predetermined chirps; and the vehicle lights may also be flashed in predetermined patterns. This signals to the user of the system that the system acknowledges the programming request and is responding accordingly.

At a subsequent step 715, the vehicle security system is substantially programmed based on the received information. The new function settings are effectively stored in the operation memory. With the conclusion of the actual reprogramming of the system, the routine has concluded one program cycle, as indicated by step 720, and program control is returned to step 700 for another cycle of system monitoring operation.

Upon determining that the system feature programming code (command string) was not received at step 705, which is a situation of normal system monitoring operation, the routine continues at step 725. At step 725, another decision is made to determine whether or not a normal remote control transmitter input has occurred. If it has, at step 727, the remote control transmitter system operation is performed (arm, disarm, panic, auxiliary channel output activation), then at step 730, the program control is returned for another cycle of the system monitoring operation. If at step 725, there is no remote control transmitter input, then base controller 30, proceeds to step 735.

If during normal system monitoring at step 735, there has been a security event that triggered any of the various system sensors, the routine proceeds to the initiation of the alarm function corresponding to the nature of the triggering event. After the conclusion of the alarm operation, normal monitoring resumes, and when the main program loop is complete, the routine concludes at step 740 where the control returns to the starting step 700 for another cycle of monitoring program execution.

Figure 8:
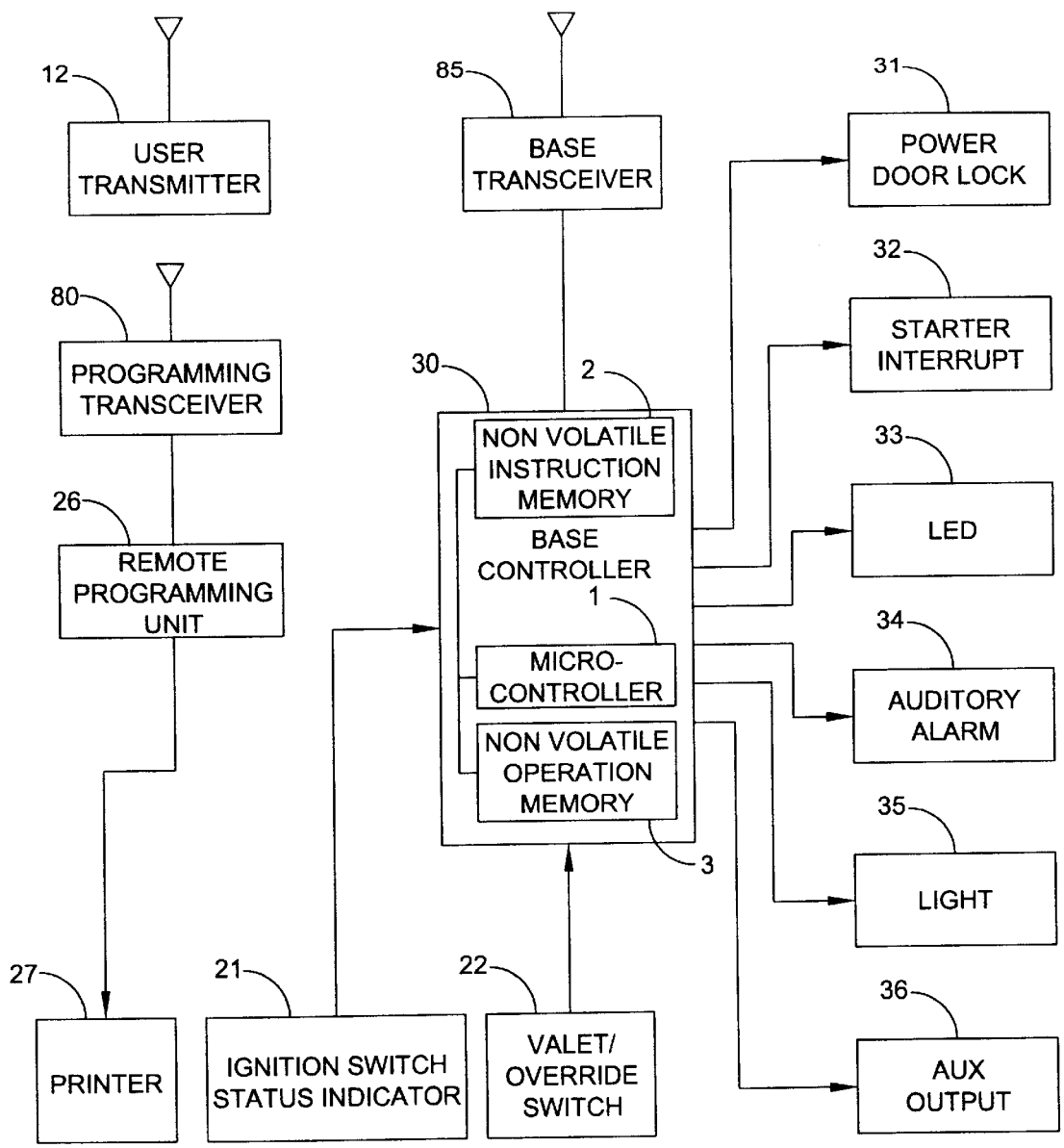
FIG. 8 is a block diagram of the circuit configuration of a vehicle security system that employs two-way wireless function-programming.

FIG. 8 shows another embodiment of the invention. This embodiment is similar to the embodiment shown in FIG. 4. A programming transceiver 80, however, is substituted for the programming transmitter 11 of FIG. 4. A base transceiver 85 is also substituted for the base receiver 10 of FIG. 4. In this embodiment, the user can initiate a program read request command. This could be initiated by pressing a dedicated button on the face of the hand-held embodiment of the remote programming unit 26, or scrolling to the program read request in the operational routine menu and activating the switch internal to the scroll wheel or another switch to initiate the command, as examples.

The instructions in the instruction memory of the remote programming unit are programmed so that user initiation of a program read request command causes the controller/microcontroller of the remote programming unit to send a program read request signal to the programming transceiver. This causes a program read request signal to be transmitted by the programming transceiver. This signal can be sent in a multi-section transmission, or encrypted packet, as described in relation to FIG. 6.

When base controller 30 receives a program read request signal, it sends data from operation memory 3 to base transceiver 85 for transmission. This data can be sent in a multi-section transmission, or encrypted packet, as described in relation to FIG. 6. This data is received by programming transceiver 80, and passed to remote programming unit 26. There, it is stored in the non-volatile programming or temporary memory of the remote program unit, for display, manipulation, and transmission as described above. In one embodiment, the data received overwrites the data that had previously occupied the temporary or programming memory. In another embodiment, the remote programming unit contains a separate program receive memory where incoming data can be stored temporarily. This memory could be embodied as a device separate from the device that embodies the programming memory. It could also be embodied in the same physical device as the programming memory, but at addresses other than those used for the programming memory. Data in the program receive memory can later be manipulated by the controller/microcontroller in the remote programmer and transferred to the temporary or programming memory for transmission. When the remote programming unit is embodied in a personal computer, configuration data received by the programming transceiver can be stored in a file on the hard drive of the computer or any other non-volatile storage device. Data stored in this way could later be recalled, modified, and loaded into the temporary or programming memory of the remote programming unit for retransmission to base controller 30, for loading into the operation memory of base controller 30, to dictate the behavior of base controller 30's functions.

Figure 9:
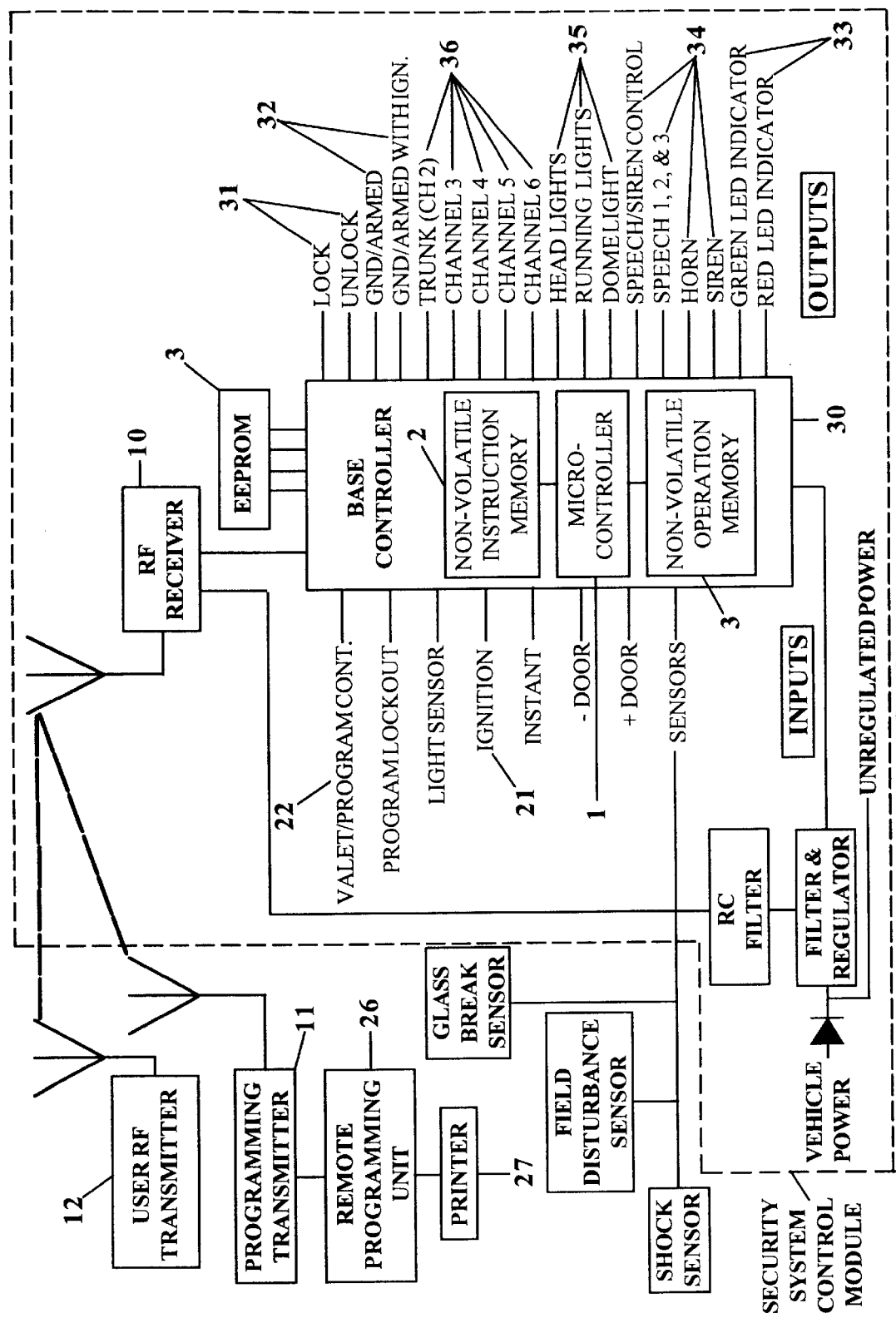
FIG. 9 is a block diagram of the circuit configuration of an advanced vehicle security system that employs wireless function-programming.

FIG. 9 is a block diagram of the circuit configuration of an advanced vehicle security system that employs wireless function-programming and is the same as FIG. 4 with more details shown. All references are the same for inputs, the user remote control transmitter 12; the remote programmer (programming transmitter 11, remote programming unit 26, and printer 27; the base receiver 10; memory (external EEPROM 3, or internal non-volatile operation memory 3; and base controller 30, (with internal microcontroller 1); but there are additional details shown without references. The additional details include sensors (shock sensor, field disturbance sensor, and glass break sensor), power supply connected to vehicle power with a protection diode, unregulated power, filter and regulator, and an RC filter going to the base receiver 10, +/− door inputs, an instant input, a light sensor input, and a program lockout input to prevent accidental, unintentional, or subversive intentional programming of the unit function-programming or user remote control transmitters. The outputs show a lock and unlock outputs for power door lock output 31; a ground when armed and a ground when armed plus ignition outputs for starter interrupt 32; green LED and red LED indicator outputs for LED output 33; speech, horn, and siren outputs for auditory siren output 34; head, running, and dome light outputs for light output 35; and trunk(channel 2), channels 3, 4, 5, and 6 outputs for auxiliary output 36. Additionally, a security system with an internal remote starting capability would comprise additional or different inputs to perform the remote starting of a vehicle. Some of the inputs required would be tach, neutral sense, brake, hood (which can be an input to the security section of the system), and remote start activation. Some of the outputs required would be starter, one or more ignition outputs, and accessory (to activate the heater or air conditioner).

Figure 10A:
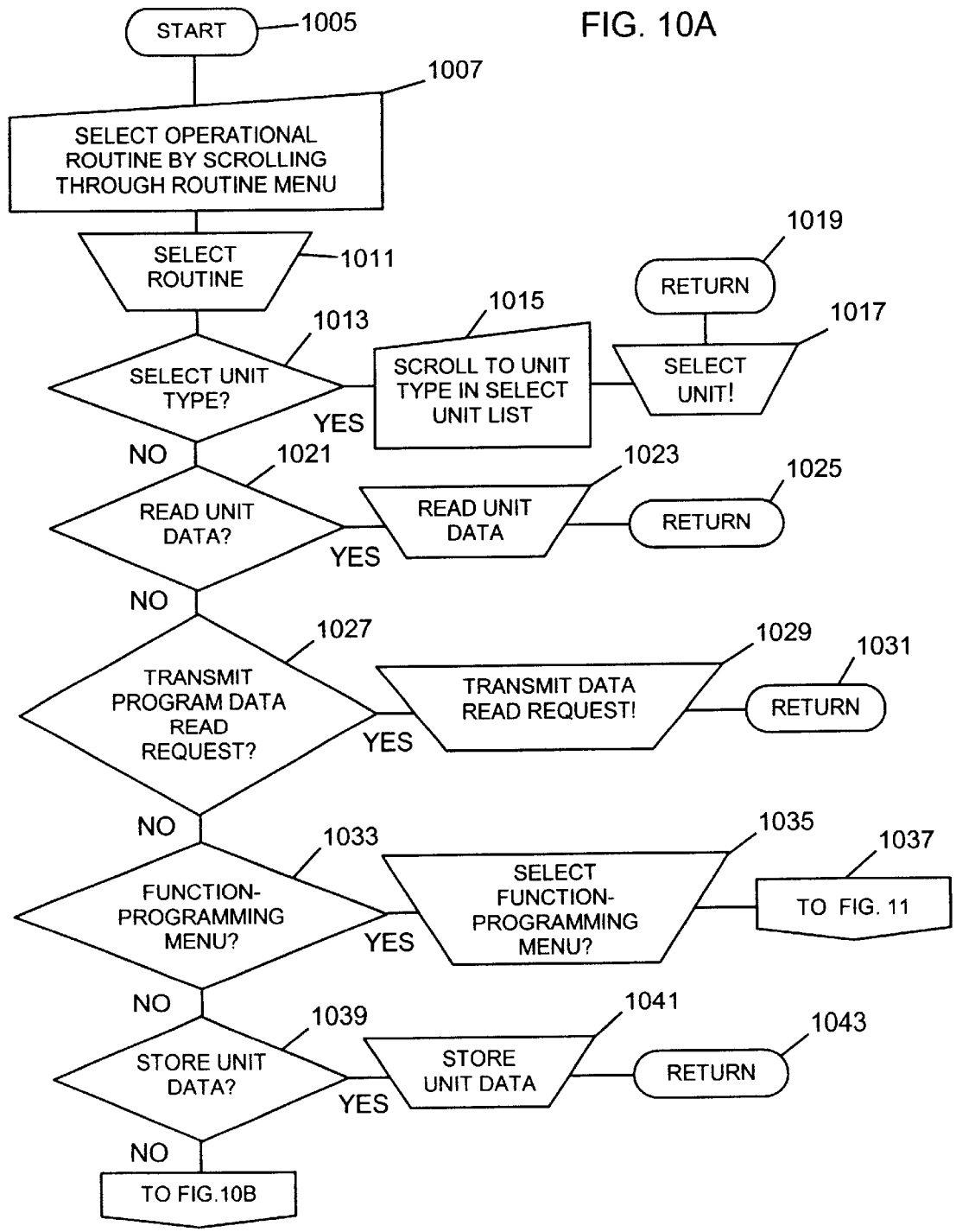
FIGS. 10A–B is a flow chart for the remote programmer operating program to select and perform operational routines using a minimum of control inputs.
Figure 10B:
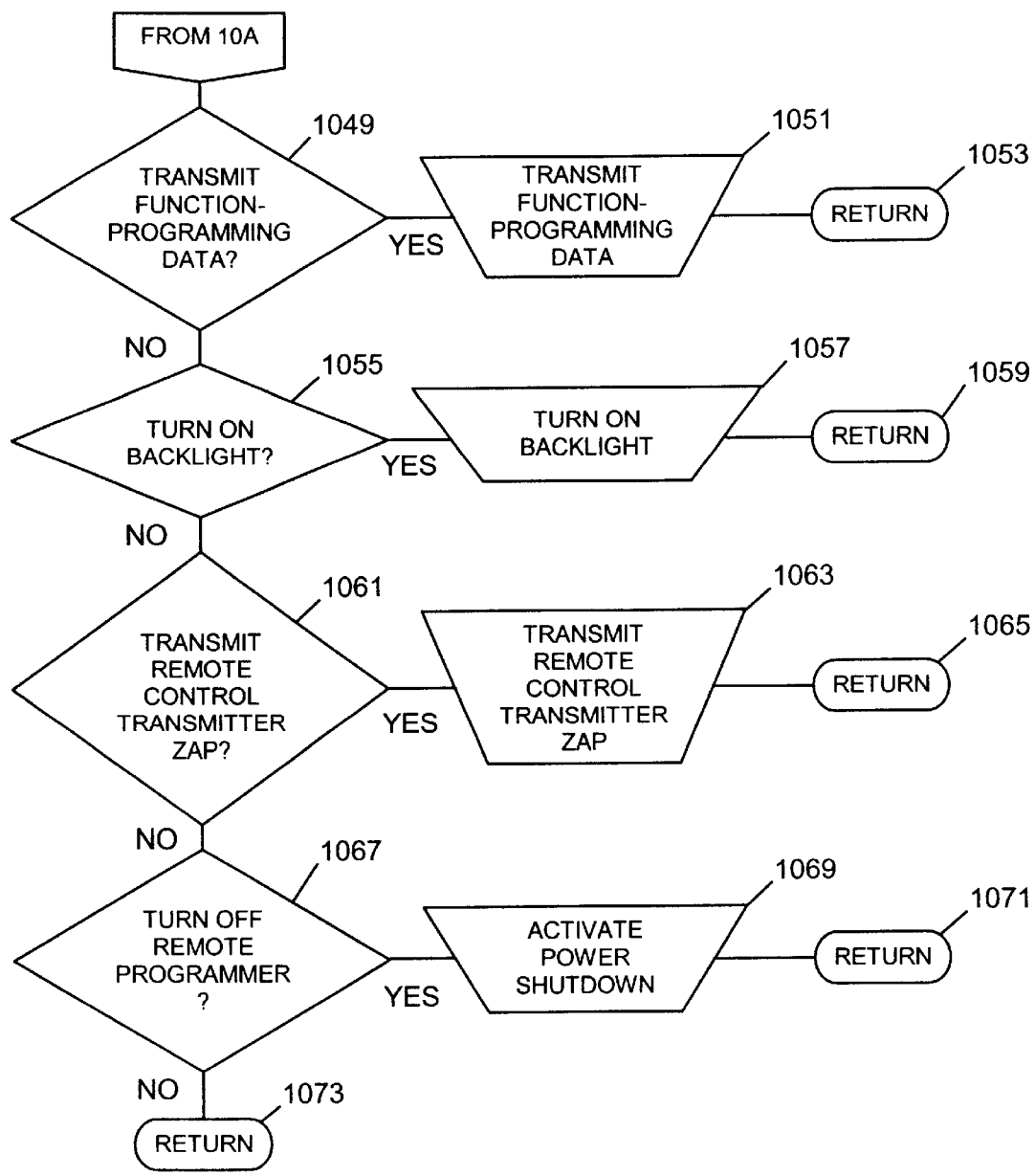

FIGS. 10A–B is a flow chart for the remote programmer operating program to select and perform operational routines using a minimum of control inputs. If there are sufficient switches to activate all of the required operational routines of the remote programmer, then the operational routine menu and its controls would not be required. All the manual inputs for FIGS. 10A–B can be performed using a scroll wheel and its internal, push to activate switch, allowing all inputs for the remote programmer to be activated with the same scroll wheel and internal switch. The manual inputs can also be performed with 2 or more scroll switches (scroll up, scroll down, scroll right switch 3, and scroll left switch 4) and an activation or selection switch. The remote programmer can be put into a sleep mode with a selected input in the operational routine menu, and awaken through an interrupt or other method by depressing the scroll wheel activating its internal switch. Additionally, the remote programmer goes to sleep if there is no activity within a predetermined time period.

At step 1005, the remote programmer is awaken by depressing the scroll wheel. If the remote programmer went to sleep because of inactivity, then the menu is at the same place that it was when the remote programmer went to sleep, but if the remote programmer was turned off by the installer/user, then it will awaken on the first step of the menu. At step 1007, the user scrolls to the desired operational routine and selects it by depressing the scroll wheel at step 1011. The remote programmer controller then determines which sub-routine to perform. At step 1011, if the select unit type routine is selected, then at step 1013, the controller proceeds to display the select unit type list on the remote programmer for the user to select a unit type by scrolling through the list at step 1015, and then selecting the desired unit at step 1017, by depressing the scroll wheel. The remote programmer operational program can then return at step 1019, to the start step 1005, and display the operational routine menu, as it does in steps 1025, 1031, 1043, 1053, 1059, 1065, 1071, and 1073. When the operational program returns at the above steps, it is more efficient for controller to return to the next selection in the operational routine menu, this way, the user will then have fewer selections to scroll through to make the next selection.

Once the security system type is identified, the next step would be to load function-programming data for the identified system either from stored data kept in non-volatile programming memory of the remote programmer or to load the data from the security system if both the remote programmer and the base security system have transceivers. At step 1021, the controller checks to see if read unit data was selected at step 1011, if it was, then at step 1023, the user depresses the scroll wheel to activate the internal switch to have the remote programmer either download functional programming data from non-volatile programming memory or set up indicia to reference the data in non volatile memory, the controller then returns at step 1025 as disclosed above. If both the base unit and the remote programmer have transceivers and the transmit program data request is selected, at step 1027, the controller initiates a function-programming data read request transmission upon activation of the transmit data read request manual input at step 1029, before the controller returns at step 1031 to step 1005. The function-programming data for the security system can then be transmitted from base controller 30, to the remote programmer for modification.

Now that the function-programming data for the identified unit is available and accessible to the controller of the remote programmer, the next step would be to modify the function setting indicia and data as required to match the request of the owner or user of the security system. At step 1033, if the function-programming menu was selected at step 1011, the function-programming menu will be loaded and displayed upon manual activation of an input switch (depressing the scroll wheel) at step 1035. The function-programming and data can then be modified as requested or desired by the user by going to FIG. 11 at step 1037, then selecting and changing the function setting indicia and data. Details disclosed below with reference to FIG. 11.

Once the function-programming and data is modified, the function-programming menu matrix can be displayed to verify that all the correct steps in the function-programming menu were modified. If they are correct, then the next step would be to store it in non-volatile programming memory for later use if the setup would be "the" preferred setup for the security system identified, and/or to transmit the modified function-programming indicia and data to the base unit. If store unit data was selected at step 1011, then at step 1039, the controller waits for manual activation of an input switch (depressing the scroll wheel) at step 1041, after which the identified unit function-programming data will be stored in non-volatile programming memory for later use. The controller then returns at step 1043 to step 1005. In FIG. 10B, if transmit function-programming data was selected at step 1011, then at step 1049, the controller waits for manual activation of an input switch (depressing the scroll wheel) at step 1051, after which the controller initiates the transmission of the function-programming command code and function setting indicia and data to the base unit. The controller then returns at step 1053 to step 1005.

The balance of the operational routines in the menu are totally independent and can be selected and preformed at any time as required. If at step 1011, turn on backlight was selected, then at step 1055, the controller waits for manual activation of an input switch (depressing the scroll wheel) at step 1057, after which the controller initiates the turning on of the backlight. The controller then returns at step 1053 to step 1005. If at step 1011, transmit remote control transmitter zap was selected, then at step 1061, the controller waits for manual activation of an input switch (depressing the scroll wheel) at step 1063, after which the controller initiates a transmission to the base unit that will delete all programmed remote control transmitters from the security system non-volatile memory assigned to store transmitter programming code identification data. This operation requires that the user reprogram the selected remote control transmitters back into the security system before system function-programming can proceed, unless global function-programming is to be done (for all transmitters programmed into the system). The controller then returns at step 1065 to step 1005. If at step 1011, turn power off was selected, then at step 1067, the controller waits for manual activation of an input switch (depressing the scroll wheel) at step 1069, after which the controller initiates the power down of the remote programmer. The controller would then at step 1071 return to step 1005 upon an activation of the selection switch that awakens the remote programmer. If no additional routines are added to the operational routines menu for selection by the user, then at step 1073, the controller returns to step 1005. FIG. 11 is a flow chart for the operating program in the remote programmer that uses the minimum of control inputs to scroll through the menu and select the correct data to modify a set of function-programming data. This chart assumes that the function-programming menu for an identified base unit is in memory (temporary or non-volatile programming with indicia available to locate same). FIG. 11 programming can be accomplished with a scroll wheel and an internal push to activate switch. The manual inputs can also be performed with 2 or more scroll switches (scroll up, scroll down, scroll right switch 3, and scroll left switch 4) and an activation or selection switch. FIG. 11 only shows a few different function-programming routines (menu steps) that represent most or all normal function-programming routines. In an advanced system, there may be 30 or more function-programming steps, but the few steps detailed are very representative of all steps for most or all systems. The following are feature/function-programming menus from an advanced system. There are 3 separate menus to simplify programming with a minimum of switches and/or a programmed remote control transmitter when done step by step without a menu:

| Feature # | Default | Alternate |
|---|---|---|
| | Menu 1 (Basic features/functions) | |
| 1 | Active arming | Passive arming |
| 2 | Chirps on | Chirps off |
| 3 | Ign. Locks on | Ign. Locks off |
| 4 | Active locking | Passive locking |
| 5 | Panic/Ign. On | No panic/Ign. On |
| 6 | 0.8 Sec. Lock pulses | 3.5 Sec. Lock pulses |
| 7 | Forced passive arm on | Forced passive arm off |
| 8 | Auto eng. Disable off | Auto eng. Disable on |
| 9 | Armed while driving | Vehicle recovery system |
| 10 | Code hopping on | Code hopping off |
| | Menu 2 (Advanced features/functions) | |
| 1 | Siren only | Voice module and siren |
| 2 | 30 Sec. Siren duration | 60 Sec. Siren duration |
| 3 | NPC on | Nuisance prevention circuitry off |
| 4 | Progressive Dr trigger | Progressive door trigger off |
| 5 | Ghost SW input 2 Pls. | Ghost Switch input 1–5 pulses |
| 6 | Standard disarm mode | Ghost Switch disarm |
| 7 | Ign. Controlled dome | Ignition controlled domelight off |
| 8 | Ign. D/L off if door open | Ign. Door lock on if door open |
| 9 | Panic Mode on | Panic Mode off |
| 10 | Door sensor bypass chirp on | Door sensor bypass chirp off |
| | Menu 3 (Auxiliary channel outputs) | |
| 1 | Channel 3: Validity | Latched/latched, reset with ignition/timed 30/60/90/timed other/linked (validity) |
| 2 | Channel 4: Validity | Same as above |
| 3 | Channel 5: Validity | Same as above |
| 4 | Channel 6: Validity | Same as above |
| 5 | Channel 6: 15 Sec. | 5/10/15/20/25/30 Second timed |
| 6 | CH. 7 second unlock | Ch. 7: Std. Channel |
| 7 | Dbl. Pulse unlock off | Double pulse U/L on |
| 8 | Horn output flash | Horn output constant |
| 9 | Disarm with CH. 2 | Disarm with channel 2 off |
| 10 | Ground when armed in valet mode on | Ground when armed in valet mode off |

Feature 2 of menu 2 (advanced features) is programmable from 1–180 seconds using any remote programmer (direct wired or wireless). The advanced programmable features/functions on a high volume alarm can also contain some of the features/functions of menu 3, but there could or could not be any menu 3. Note that almost all programmable feature/functions only have a default and one alternate.

At step 1105, FIG. 11, it shows the start coming from an off page reference of FIG. 10A (reference step 1037 FIG. 10A). The function-programming menu is loaded and displayed on the remote programmer display. At step 1107, the installer/user scrolls through the menu on the display to select preferred programming step and when the selected step is chosen, the step is selected at step 1111. If the function-programming transmitter allocation step is selected at 1111, then the remote programmer controller initiates the display of the appropriate selections (last, global, or other information to describe the transmitter allocation) for the user to scroll through at step 1115, to make the programmable selection. In the case of transmitter allocation, the selection can be to allocate the function-programming indicia and data to the last remote control transmitter used for; remote control of the security system, to put the system into the program mode, or to enable the programming capability and allow access in case of 2-way communication. Linking the programming to the last remote control transmitter used in any of the above cases, allows for owner recognition and for a complete set of function-programming data for each transmitter programmed into the system. The other selection would be to allocate the function-programming data to all transmitters programmed into the security system (global or for all transmitter function-programming slots in the system). As a reference case for matrix programming, the last transmitter used is the selection made, which for reference has a binary value of 1. Once the selection is made, the controller waits for manual activation of an input switch (depressing the scroll wheel) at step 1117, after which the controller stores the data in temporary or non-volatile programming memory and returns to function-programming menu for further selections.

If system mode of operation is selected at step 1111, then at step 1119, the controller initiates display of the appropriate selections (active, passive) for the user to scroll through at step 1121, to make the programmable selection. The user then leaves the pointer (this can be any method of identifying the selection (highlight, move a marker or any other method of identifying the selection)). As a reference case for matrix programming, active is the selection made, which for reference has a binary value of 0. Once the selection is made, the controller waits for manual activation of an input switch (depressing the scroll wheel) at step 1117, after which the controller stores the data in temporary or non-volatile programming memory and returns to function-programming menu for further selections.

If siren duration is selected at step 1111, then at step 1125, the controller initiates display of the appropriate selections (30, 60, 1–180) for the user to scroll through at step 1121, to make the programmable selection. The user then leaves the pointer (this can be any method of identifying the selection (highlight, move a marker or any other method of identifying the selection)). In the case of siren duration, if 1–180 is selected, then the controller initiates a display showing the number 1 allowing the installer/user to scroll to a requested/desired time between 1 and 180 seconds for the siren duration. As a reference case for siren duration, 110 seconds is the selection made, which for reference has a binary value of 01101110. Once the selection is made, the controller waits for manual activation of an input switch (depressing the scroll wheel) at step 1117, after which the controller stores the data in temporary or non-volatile programming memory and returns to function-programming menu for further selections.

If auxiliary channel programming (in this case we are using channel 6 for programming) is selected at step 1111, then at step 1135, the controller initiates display of the appropriate selections (pulse/validity, latched, latched/reset with ignition, timed/30 seconds, timed/60 seconds, timed/90 seconds, timed/other, linked (pulse/validity) for the user to scroll through at step 1137, to make the programmable selection. The user then leaves the pointer (this can be any method of identifying the selection (highlight, move a marker or any other method of identifying the selection)). If timed/other was selected, the remote programmer controller would display a 1 allowing the installer user to dial up with the scroll wheel, a number indicating a time between 1 and 180 seconds. As a reference case for matrix programming, "linked (pulse/validity)" is the selection made, which for reference has a binary value of 111.

Linking the transmitter to the data stored sets up one of the auxiliary outputs to control the vehicle accessories to the setups desired by the user (seat position, radio presets, temperature control (heat/air conditioning), etc.) and the output only operates when the transmitter so programmed is used. If other is selected and used there will be 8 bits in the binary data value. Once the selection is made, the controller waits for manual activation of an input switch (depressing the scroll wheel) at step 1117, after which the controller stores the data in temporary or non-volatile programming memory and returns to function-programming menu for further selections.

At this time, any of the other function-programming steps/selections can be made from the function-programming unit for the identified base unit, but if not then the user can select to exit the function-programming routine of the remote programmer. If exit is selected at step 1111, then at step 1139, the controller goes to step 1141, which returns the operational program of the remote programmer to the select operational function routine.

1-way remote programming using a matrix to program one or more function-programming features uses the data stored in the steps above in association with the a matrix linked to the identified security system function-programming menu. As a reference, the menu disclosed above is used. The reference case for the matrix programming with the 4 steps is used below in the matrix programming. The first 10 bits (number used for reference is 381 (0101111101)) of the transmitted function setting data are the identification bits for the security system being programmed. These identification bits provide information that is used to guarantee that a system is not programmed incorrectly. If the identification bits for the security system does not match the security system that is being programmed, the function-programming command and function setting information is ignored and the receiving system notifies the user with a warning signal that the information has been refused. Second a control bit that indicates if the data is to be stored to indicate one transmitter or all transmitters (last, global) and determines how the function-programming data is stored and used by base controller 30, it is separated by 2 spaces and is second in the function-programming indicia and data. The X's represent the function-programming command or enable code word and are not part of the function setting information/matrix information. The function setting information comprises; function setting indicia that comprises unit identification (0101111101), transmitter allocation (1), and the actual programming menu matrix indicating the selections that were actually changed (10000 00000 01000 00000 00010 00000); and the programming control data (function setting information) for the selections that were changed (0 01101110 111). The command string for the above menu with the 3 steps actually changed indicated by 1's in the matrix follows:

Function programming command: XXXXXXXXXXXXXX
Function setting Indicia: 0101111101 1 10000 00000 01000 00000 00010 00000
Function setting data: 0 01101110 111

The remote programmer's controller used the data accumulated and stored during the function-programming steps above to set up the function setting information (function setting indicia and function setting data) in a sample format that is predetermined before the systems (remote programmer and base units) are programmed. This function setting information can take any format to simplify the operation and programming of the systems, but a matrix for the actual system menu to identify any steps/selections that are changed and the data for the changed steps/selections that are changed are required for the matrix function-programming to operate. The example above is used to simplify the explanation of matrix function-programming that allows the user to program one or more function-programming steps/selections without knowing how the balance of the function-programming selections are programmed. Case in point, a customer comes into an installation center business and asks his installer (the person who originally installed his system) to change the selections listed above. He says I want the system to actively arm and disarm. I want the siren duration set to 110 seconds. I want vehicle accessories linked to channel 6. The customer tells the installer that he has a 381 system. The installer proceeds to make the changes with the 1-way matrix remote programmer. Note, this capability can be selected on the programmer in the operational routine menu (change 1 step, change 1 or more steps, change all function-programming steps). Additionally, a matrix for the function-programming menu with the associated data can be used to accomplish any of the above listed capabilities.

FIG. 12 is a modified flowchart based on the FIG. 7 flowchart. FIG. 12 is simplified flow chart for base controller operational programming. It shows the basic steps for the base controllers operation for matrix programming of function-programming information of the system features. At step 1200, the beginning of the normal main loop of the operating program is shown. At step 1205 a check to see if function-programming code transmission is received by the base unit. Base controller 30, verifies the command string and if it is correct, it initiates a siren chirp/light flash confirmation signal . If it is incorrect, the confirmation is a warning signal or no signal at all as a warning to the user that something is wrong. At step 1211, base controller 30, loads function programming data from the operation memory into temporary memory as indicated by the transmitter allocation code, and at step 1213, the function-programming data is modified, manipulated, or altered based on the function setting indicia and function-programming data received. If there is sufficient memory buffers, all the operation memory can be loaded at one time, modified, manipulated, or altered at step 1213, and stored back into operation memory at step 1217, otherwise, the operation memory is loaded block by block and modified or altered at step 1213, one block at a time based on the function setting indicia, and the function-programming data received and stored back into operation memory block by block at step 1217. Alternative terms for this operation would be that controller 30 loads functional programming data from operation memory, sorts, manipulates, and alters the functional programming data as indicated by the function setting indicia, then stores the altered function-programming data into operation memory as indicated by function setting indicia. Upon completion of the data modification at step 1213, and storing in operation memory at step 1217, then at step 1220, base controller 30, returns to the main operational programming loop to perform other routines. The return is normally to the program step immediately following the step that routed the program to the routine being performed, but it could also route it to the beginning of the loop from which it was routed.

If at step 1205, a function-programming code is not received, then at step 1225, base controller 30, checks to see if a normal remote control transmitter code is received and if it is, at step 1227, base controller 30, performs the remote control transmitter system operation (arms the system, disarms the system, initiates an output on one of the auxiliary channels, etc.). Once the system operation is completed, at step 1230, base controller 30, returns to the main operational programming loop to perform other system operational routines. If at step 1225, no normal remote control transmitter code is received, then base controller 30, proceeds to process routines to perform all the other system operational functions, before returning to the beginning of the main operational programming loop at step 1240.

While the invention has been described by reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

I claim:

1. A remote programming apparatus for remotely programming a system base unit via a wireless link using function setting indicia and data, said apparatus comprising:
   a power source;
   a controller;
   user operable switches;
   an electromagnetic signal transmitter;
   a display;
   a non-volatile program memory; and
   a non-volatile instruction memory connected to the controller and holding the instructions that control the operation of the controller for formatting and transmitting said function setting indicia and data.

2. The remote programming apparatus of claim 1 wherein the non-volatile instruction memory includes instructions to:
   a) load the function-programming menu for said base unit,
   b) to scroll through a list of programmable features and their settings,
   c) display the names of user selectable features and their settings on said display,
   d) to alter the value of function setting indicia and data,
   e) display the names of altered user selectable features and their settings on said display,
   f) transmit said user selected command string to said base unit.

3. The remote programming apparatus of claim 1, wherein said system base unit is part of one of a vehicle security system, a keyless entry system, or a user convenience system, and wherein said new function settings are stored in said operation memory to dictate the behavior of said base unit's functions.

4. The remote programming apparatus of claim 1, wherein the power source, the controller, the user operable switches, the display, the non-volatile instruction memory, and the non-volatile programming memory of said remote programmer are substituted by one of a personal computer, a laptop personal computer and a personal digital assistant.

5. The remote programming apparatus of claim 4, wherein the electromagnetic signal transmitter of said remote programmer is part of remote programming circuitry that is peripherally attached to or integrally fixed into one of a personal computer, a laptop personal computer, and a personal digital assistant.

6. The remote programming apparatus of claim 1, 2 or 4, wherein the power source is a battery.

7. The remote programming apparatus of claim 1, 2 or 4, wherein the power source is alternating current power source.

8. The remote programming apparatus of claim 1, wherein the electromagnetic signal transmitter is a radio frequency transmitter.

9. The remote programming apparatus of claim 1, further comprising a display, on which a representation of at least part of the function programming matrix is displayed.

10. The apparatus of claim 1, wherein said display comprises a graphical interface.

11. A system for programming a security system base unit with a remote programmer, loading the function-programming menu for said base unit, using said remote programmer to alter function setting indicia and data for selected steps in said menu of the said base unit, transmit a command string comprising a function programming command and function setting indicia and data from said remote programmer to said base unit, said transmit being done via an electromagnetic signal link, wherein the altered function-programming settings are stored to dictate the behavior of the base controller's functions, said apparatus comprising:
   a remote programmer comprising:
      a power source;
      a controller;
      user operable switches;
      a display;
      a non-volatile program memory; and
      a non-volatile instruction memory connected to the controller holding instructions that control the operation of the controller, including instructions to:
         a) load the function-programming menu for said base unit,
         b) to scroll through a list of programmable features and their settings,
         c) display the names of user selectable features and their settings on said display,
         d) to alter the value of function setting indicia and data,
         e) display the names of altered user selectable features and their settings on said display,
         f) transmit said user selected command string to said base unit;
   a base unit comprising:
      a controller;
      an electromagnetic signal receiver;
      an output signaling device;
      a non-volatile programmable operation memory; and
      a non-volatile instruction memory connected to the controller holding instructions that control the operation of the controller, including instructions to:
         a) determine whether or not a function-programming code is received,
         b) signal the user that, the system acknowledges the function-programming code and that said base unit is responding accordingly, c) load function-programming settings,
d) alter function-programming settings as required by function setting indicia and data received,
e) store function-programming settings in said base unit's non-volatile operation memory, to dictate the behavior of said base unit's functions,
f) determine whether a security event has occurred in a default system monitoring operation if the function-programming code is not received, and
g) initiate a security system operational function in response to a determination that a security event has occurred.

12. The system of claim 11, wherein said controller of said base unit is part of one of a vehicle security system, a keyless entry system, or a user convenience system, and wherein said new function settings are stored in said operation memory to dictate the behavior of said base unit's functions.

13. The system of claim 11, wherein the user notification signals are predetermined chirps and/or lights flashed in predetermined patterns.

14. A method of remotely programming a base unit using a remote programmer, wherein function-programming menu data is loaded from non-volatile memory, selected data is altered by the user of the remote programmer, and sent to the base unit with function setting indicia to control sorting and storage in the operation memory to dictate the behavior of the base unit's functions, said method comprising the steps of;
a) the remote programmer loading function-programming menu data from memory;
b) the remote programmer displaying said data for manipulation;
c) the user scrolling through said data on the display;
d) user altering value of selected function-programming data;
e) altered data being displayed on said display;
f) the user then initiating a transmission of said data and function setting indicia;
g) the base unit receiving said data and said indicia
h) the base unit loading specified function-programming settings from operation memory;
i) the base unit sorting and altering said data as indicated by said indicia and storeing said data in said operation memory to dictate the behavior of said base unit's functions.

15. The method of claim 14 further comprising the step of producing at least one of a visual and audible acknowledgement signal upon receipt of the user selectable command string.

16. The method of claim 14 wherein the base unit is a part of a vehicle security system.

17. The method of claim 14 wherein the base unit is a part of a keyless entry system.

18. The method of claim 14 wherein the base unit is a part of a user convenience system.

19. An apparatus for programming a base unit with a remote programmer, load the function-programming menu from remote programmer memory for said base unit, using said remote programmer to alter function-programming indicia and data for selected steps in said menu of said base unit, transmit a command string comprising a function programming command and function setting indicia and data from said remote programmer to said base unit, said transmit being done via an electromagnetic signal link, wherein the new function-programming setting data is manipulated and stored in operation memory to dictate the behavior of the base controller's functions, said apparatus comprising:

a power source;

a controller;

user operable switches;

an electromagnetic signal transmitter;

a display;

a non-volatile programming memory; and a non-volatile instruction memory connected to the controller holding instructions that control the operation of the controller, including instructions to:
a) load the function-programming menu for said base unit from remote programmer memory,
b) scroll through the list of programmable features and their settings as represented in the function-programming menu for said base unit,
c) display the names of the user settable features and the corresponding value or meaning for that feature in the function-programming menu for said base unit, on said display,
d) alter the value,
e) display the names of the altered user settable features and the corresponding value or meaning for that feature, on said display,
f) transmit the function programming command and function setting indicia and data to the base unit for manipulation and storage in the operation memory, to dictate the behavior of said base unit's functions.

* * * * *